US007864957B2

(12) United States Patent
Shimada et al.

(10) Patent No.: US 7,864,957 B2
(45) Date of Patent: Jan. 4, 2011

(54) METHODS AND APPARATUS FOR SECURE DISTRIBUTION OF PROGRAM CONTENT

(75) Inventors: Muneki Shimada, Tokyo (JP); Toyoshi Okada, Tokyo (JP); Yousuke Kimoto, Kanagawa (JP); Kazuhiro Kanee, Chiba (JP); Kenjiro Komaki, Saitama (JP)

(73) Assignee: Sony Computer Entertainment Inc. (JP)

( * ) Notice: Subject to any disclaimer, the term of this patent is extended or adjusted under 35 U.S.C. 154(b) by 640 days.

(21) Appl. No.: 10/316,309

(22) Filed: Dec. 11, 2002

(65) Prior Publication Data

US 2003/0126430 A1 Jul. 3, 2003

(30) Foreign Application Priority Data

Dec. 21, 2001 (JP) ............................. 2001-389452

(51) Int. Cl.
*H04N 7/167* (2006.01)
*H04L 29/00* (2006.01)
*G06F 7/04* (2006.01)
*G06F 17/30* (2006.01)
*G06F 15/16* (2006.01)

(52) U.S. Cl. ................... 380/233; 713/155; 713/156; 713/173; 713/175; 726/10

(58) Field of Classification Search ................. 380/233; 713/175

See application file for complete search history.

(56) References Cited

U.S. PATENT DOCUMENTS 4,688,169 A    8/1987 Joshi
5,046,090 A    9/1991 Walker et al.

(Continued)

FOREIGN PATENT DOCUMENTS

EP    0519695 A2    12/1992

(Continued)

OTHER PUBLICATIONS

Konstantas, Dimitri. Morin, Jean-Henry. "Trading Digital Intangible Goods: The Rules of the Game". Proceedings of the 33rd Annual Hawaii International Conference on System Sciences. Pub. Date: Jan. 2000. On relevant pp. 1-10. Found on the World Wide Web at: http://ieeexplore.ieee.org/stamp/stamp.jsp?tp=&arnumber=927023.*

(Continued)

*Primary Examiner*—William R Korzuch
*Assistant Examiner*—Jeremiah Avery
(74) *Attorney, Agent, or Firm*—Lerner, David, Littenberg, Krumholz & Mentlik, LLP

(57) ABSTRACT

Methods and apparatus in accordance with the present invention are operable to carry out certain functions including: receiving an encrypted program at a processing apparatus; transmitting a machine ID over a network to an administrator; receiving registration data over the network from the administrator in response to the machine ID; transmitting the registration data over the network to a distributor; receiving an encrypted decryption key and an encrypted virtual ID at the processing apparatus over the network from the distributor in response to the registration data; decrypting the encrypted decryption key using the virtual ID, and decrypting the encrypted program using the decryption key; re-encrypting the program using the virtual ID; and storing the encrypted virtual ID and the re-encrypted program in a first storage device.

78 Claims, 17 Drawing Sheets

U.S. PATENT DOCUMENTS

| | | | |
|---|---|---|---|
| 5,499,357 A | 3/1996 | Sonty et al. | |
| 5,537,529 A | 7/1996 | Borovoy et al. | |
| 5,577,232 A | 11/1996 | Priem et al. | |
| 5,757,908 A | 5/1998 | Cooper et al. | |
| 5,805,551 A * | 9/1998 | Oshima et al. | 705/57 |
| 5,835,911 A | 11/1998 | Nakagawa et al. | |
| 5,862,325 A * | 1/1999 | Reed et al. | 709/201 |
| 5,930,358 A | 7/1999 | Rao | |
| 5,951,639 A | 9/1999 | MacInnis | |
| 5,982,892 A * | 11/1999 | Hicks et al. | 705/51 |
| 6,006,190 A | 12/1999 | Baena-Arnaiz et al. | |
| 6,075,862 A * | 6/2000 | Yoshida et al. | 380/28 |
| 6,115,471 A * | 9/2000 | Oki et al. | 380/242 |
| 6,189,146 B1 * | 2/2001 | Misra et al. | 717/177 |
| 6,226,618 B1 * | 5/2001 | Downs et al. | 705/1 |
| 6,347,846 B1 * | 2/2002 | Nakamura | 380/203 |
| 6,427,132 B1 * | 7/2002 | Bowman-Amuah | 703/22 |
| 6,487,723 B1 | 11/2002 | MacInnis | |
| 6,567,915 B1 * | 5/2003 | Guthery | 713/168 |
| 6,607,136 B1 * | 8/2003 | Atsmon et al. | 235/492 |
| 6,668,331 B1 | 12/2003 | Gomes et al. | |
| 6,732,106 B2 | 5/2004 | Okamoto et al. | |
| 6,834,348 B1 | 12/2004 | Tagawa et al. | |
| 6,839,837 B1 | 1/2005 | Morishita et al. | |
| 6,879,965 B2 * | 4/2005 | Fung et al. | 705/39 |
| 6,889,321 B1 * | 5/2005 | Kung et al. | 713/153 |
| 6,952,770 B1 * | 10/2005 | Mittal et al. | 713/168 |
| 6,971,022 B1 | 11/2005 | Katta et al. | |
| 6,983,371 B1 * | 1/2006 | Hurtado et al. | 713/189 |
| 6,993,664 B2 | 1/2006 | Padole et al. | |
| 7,080,039 B1 * | 7/2006 | Marsh | 705/51 |
| 7,100,195 B1 * | 8/2006 | Underwood | 726/2 |
| 7,124,938 B1 * | 10/2006 | Marsh | 235/382 |
| 7,171,662 B1 * | 1/2007 | Misra et al. | 717/177 |
| 7,191,154 B2 * | 3/2007 | Oshima et al. | 705/57 |
| 7,213,005 B2 * | 5/2007 | Mourad et al. | 705/64 |
| 2001/0010046 A1 * | 7/2001 | Muyres et al. | 705/52 |
| 2001/0018743 A1 | 8/2001 | Morishita | |
| 2001/0051928 A1 * | 12/2001 | Brody | 705/52 |
| 2002/0026424 A1 | 2/2002 | Akashi | |
| 2002/0032584 A1 | 3/2002 | Doctor et al. | |
| 2002/0032905 A1 * | 3/2002 | Sherr et al. | 725/38 |
| 2002/0046229 A1 | 4/2002 | Yutaka et al. | |
| 2002/0052728 A1 | 5/2002 | Yutaka | |
| 2002/0077988 A1 | 6/2002 | Sasaki et al. | |
| 2002/0100035 A1 | 7/2002 | Kenyon et al. | |
| 2003/0072271 A1 * | 4/2003 | Simmons et al. | 370/255 |
| 2003/0123670 A1 * | 7/2003 | Shimada et al. | 380/281 |
| 2003/0126430 A1 | 7/2003 | Shimada et al. | |
| 2003/0140134 A1 | 7/2003 | Swanson et al. | |
| 2003/0177093 A1 | 9/2003 | Hirano et al. | |
| 2004/0243754 A1 | 12/2004 | Sakamoto | |
| 2005/0034114 A1 | 2/2005 | Weik et al. | |
| 2005/0066324 A1 | 3/2005 | Delgado et al. | |

FOREIGN PATENT DOCUMENTS

| | | |
|---|---|---|
| EP | 0 679 980 | 11/1995 |
| JP | 4-195634 | 7/1992 |
| JP | 2000-242604 | 9/1999 |
| JP | 11-275516 | 10/1999 |
| JP | 2000-242604 | 9/2000 |
| JP | 11-275516 | 10/2000 |
| JP | 2004-287818 | 10/2004 |
| KR | 20050029705 | 3/2005 |
| TW | 470885 | 3/2005 |
| WO | 00/56068 A1 | 9/2000 |
| WO | WO 00/56068 | 9/2000 |
| WO | 01/78303 | 10/2001 |
| WO | 03/021432 | 3/2003 |

OTHER PUBLICATIONS

U.S. Appl. No. 11/230,748, filed Sep. 20, 2005.
U.S. Appl. No. 11/231,131, filed Sep. 20, 2005.
U.S. Appl. No. 10/316,675, filed Dec. 11, 2002.
Notification of Reason(s) for Refusal for Japanese Application No. 2005-270993 dated Nov. 25, 2008.
Translation of Notification of Reason(s) for Refusal for Japanese Application No. 2005-270993 dated Nov. 25, 2008.

* cited by examiner

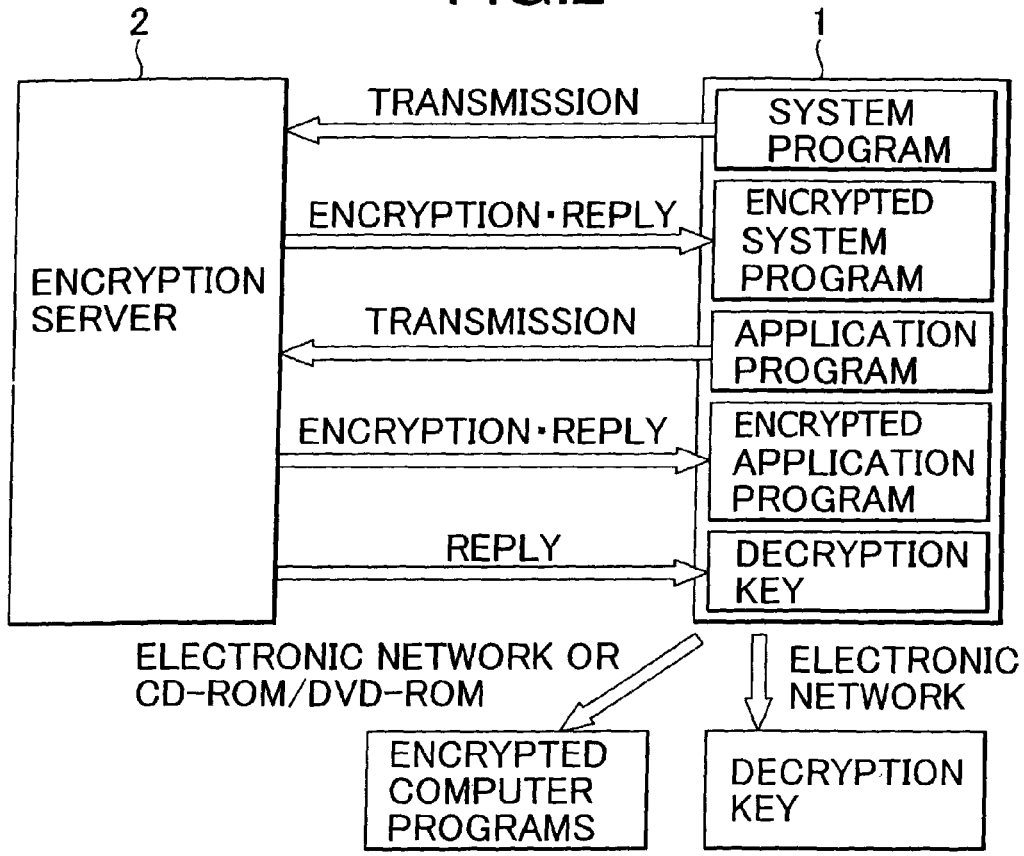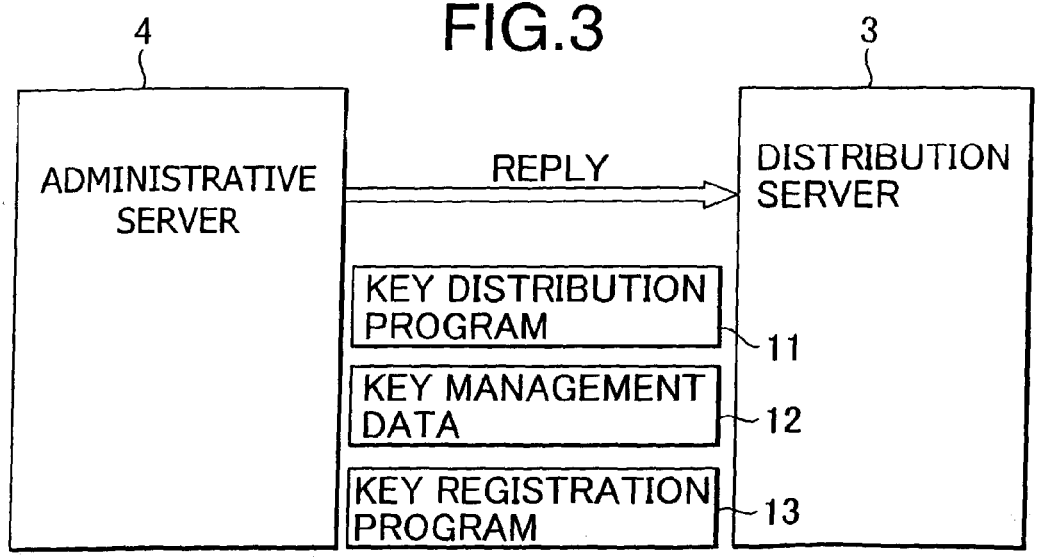

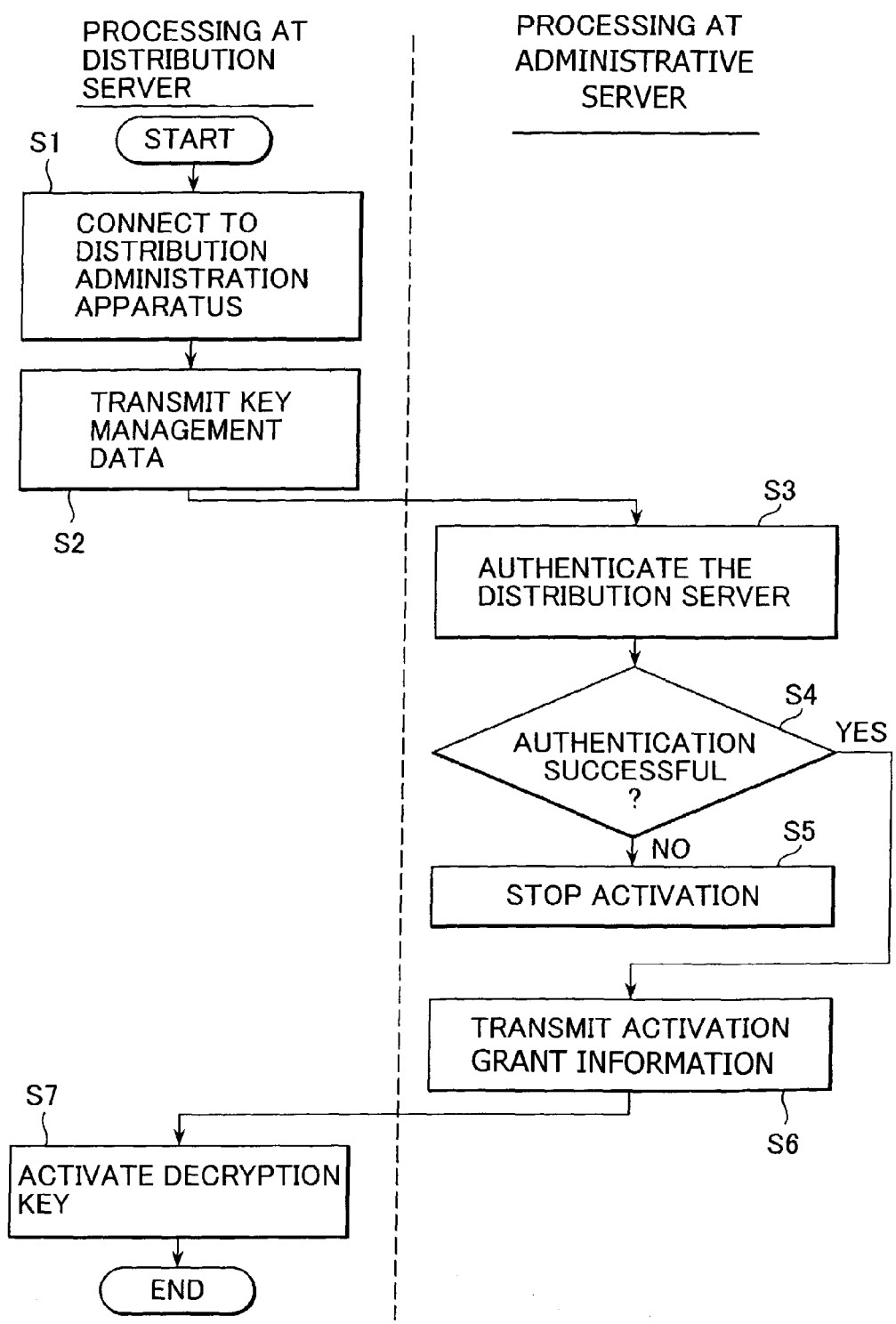

| DEVICE ID | DIST. ID |
|---|---|
| K1234 | D3456 |
| K2345 | D1278 |
| K6789 | -- |
| K0987 | -- |
|  |  |
|  |  |

FIG. 10

| MACHINE ID | VIRTUAL ID |
|:---:|:---:|
| K1234 | — |
| K2345 | B5678 |
| K6789 | B9012 |
| K0987 | — |
| ⋮ | ⋮ |

FIG. 16

| MACHINE ID | VIRTUAL ID |
|:---:|:---:|
| K1234 | — |
| K2345 | B5678 |
| K6789 | B9012 |
| K0987 | — |
| ⋮ | ⋮ |

FAILURE → (K6789 row)

| MACHINE ID | VIRTUAL ID |
|:---:|:---:|
| K1234 | — |
| K2345 | B5678 |
| K1143 | B9012 |
| K0987 | — |
| ⋮ | ⋮ |

NEW MACHINE ID → (K1143 row)

Z

METHODS AND APPARATUS FOR SECURE DISTRIBUTION OF PROGRAM CONTENT

BACKGROUND OF THE INVENTION

The present invention relates to methods and apparatus for secure distribution of program content, which are directed to the prevention of unauthorized copying and/or distribution of the program content.

Program content may include application programs, such as video game programs, word processing programs, spread sheet programs, etc.; and system programs, such as operating systems, boot programs, etc. Program content, such as computer programs, are typically distributed to end-users by way of transportable storage media, such as CD-ROMs, DVD-ROMs, etc., which contain the program content. Program content may also be distributed to end-users by way of downloading the program content over a network, such as from a server to the user over the Internet.

The conventional methods for distributing program content are not secure because unauthorized copies thereof may be made and shared among a plurality of end-users. For example, if a computer program is distributed to a particular end-user by way of a storage medium, that user may permit unauthorized copies of the computer program to be distributed and stored on equipment controlled by other end-users. Typically, these unauthorized copies are stored on hard disk drives, CD-ROMs, and the like. Similarly, if the computer program is distributed to the end-user by way of transmission over a network, unauthorized copies of the computer program may be made and distributed to other users. For example, once the computer program is stored on the authorized end-user's equipment, he or she may forward a copy of the computer program to another user by way of a storage medium (e.g., an optical disk, a magnetic disk, etc.) or by way of an attachment to an electronic mail message.

Accordingly, there are needs in the art for new methods and apparatus for the secure distribution of program content to end-users, which ameliorates the problems associated with the proliferation of unauthorized copies of the program content.

SUMMARY OF THE INVENTION

In accordance with one or more aspects of the present invention, an apparatus is operable to receive an encrypted program, where the apparatus includes: a network interface operable to provide communication with a network such that (i) a machine ID may be transmitted over the network to an administrator, (ii) registration data may be received over the network from the administrator in response to the machine ID, (iii) the registration data may be transmitted over the network to a distributor, and (iv) an encrypted decryption key and an encrypted virtual ID may be received over the network from the distributor in response to the registration data; a decryption device operable to decrypt the encrypted decryption key, to decrypt the encrypted program using the decryption key, and to re-encrypt the program using the virtual ID; and a first storage device operable to store the encrypted virtual ID and the re-encrypted program.

The network interface is preferably operable to provide communication with a network such that the machine ID and a distributor ID may be transmitted over the network to the administrator, and (ii) the registration data may be received over the network from the administrator in response to the machine ID and the distributor ID. The registration data includes at least one of the machine ID and the distributor ID.

Preferably, the identification information includes a machine ID that is substantially unique to the apparatus; and the virtual ID is associated with the machine ID. Preferably, the decryption device is operable to decrypt the encrypted virtual ID using the machine ID, to decrypt the encrypted decryption key using the virtual ID, to decrypt the encrypted program using the decryption key, and to re-encrypt the program using the virtual ID. The first storage device is further operable to store the machine ID.

It is preferred that the decryption device is operable to decrypt the encrypted virtual ID using the machine ID, and to decrypt the re-encrypted program using the virtual ID such that the apparatus is capable of executing the program.

The apparatus preferably further includes a second storage device containing the machine ID; and a processor operable to compare the machine ID stored in the first storage device with the machine ID contained in the second storage device, and to proscribe use of the machine ID contained in either of the storage devices to decrypt the encrypted virtual ID when they do not match.

The processor is preferably further operable to prompt a user of the apparatus to select a re-association routine when the machine ID stored in the first storage device does not match the machine ID contained in the second storage device. The network interface is preferably operable to facilitate: the transmission of the machine ID contained in the second storage device, when it does not match the machine ID stored in the first storage device, over the network to the distributor; and the reception of an new encrypted virtual ID over the network from the distributor, the new virtual ID being associated with the machine ID contained in the second storage device. Preferably, the first storage device is further operable to replace the encrypted virtual ID with the new encrypted virtual ID. It is preferred that the decryption device is operable to decrypt the new encrypted virtual ID using the machine ID contained in the second storage device, and to decrypt the re-encrypted program using the virtual ID such that the apparatus is capable of executing the program.

In accordance with one or more further aspects of the present invention, a method includes receiving an encrypted program at a processing apparatus; transmitting a machine ID over a network to an administrator; receiving registration data over the network from the administrator in response to the machine ID; transmitting the registration data over the network to a distributor; receiving an encrypted decryption key and an encrypted virtual ID at the processing apparatus over the network from the distributor in response to the registration data; decrypting the encrypted decryption key using the virtual ID, and decrypting the encrypted program using the decryption key; re-encrypting the program using the virtual ID; and storing the encrypted virtual ID and the re-encrypted program in a first storage device.

The method may further include transmitting the machine ID and a distributor ID over a network to the administrator; and receiving the registration data over the network from the administrator in response to the machine ID and the distributor ID.

Preferably, the method includes decrypting the encrypted virtual ID using the machine ID; decrypting the encrypted decryption key using the virtual ID; decrypting the encrypted program using the decryption key; and re-encrypting the program using the virtual ID. The method may further include decrypting the encrypted virtual ID using the machine ID, and decrypting the re-encrypted program using the virtual ID such that the processing apparatus is capable of executing the program.

The method preferably further includes comparing the machine ID stored in the first storage device with the machine ID contained in the second storage device, and proscribing use of the machine ID contained in either of the storage devices to decrypt the encrypted virtual ID when they do not match.

In accordance with one or more further aspects of the present invention, an apparatus includes an input interface operable to receive an encrypted program and a non-activated decryption key from an administrator, the non-activated decryption key, when activated, being usable to decrypt the encrypted program; a network interface operable to provide communication with a network such that (i) an activation request may be transmitted to the administrator over the network, and (ii) activation grant information may be received from the administrator over the network in response to the activation request; a data processor operable to convert the non-activated decryption key into an activated decryption key in response to the activation grant information; and a database operable to store respective activated decryption keys corresponding to a plurality of encrypted programs.

Preferably, the input interface is further operable to (i) receive decryption key management data containing a distributor ID from the administrator, the distributor ID being a substantially unique identifier; (ii) transmit the decryption key management data and the activation request to the administrator; and (iii) receive the activation grant information if the decryption key management data is valid. The non-activated decryption key is an initially encrypted decryption key, and the data processor is operable to decrypt the initially encrypted decryption key using the activation grant information to produce the activated decryption key.

It is preferred that the network interface is further operable to provide communication with the network such that respective registration data, each being related to a respective processing apparatus, may be received over the network from the processing apparatus; the database operable to store respective machine ID's, each corresponding with a respective one of the processing apparatus; the data processor is further operable to search the database for a machine ID matching any received registration data; the network interface is further operable to facilitate the transmission of an encrypted activated decryption key to the processing apparatus over the network in response to the received registration data; and the activated decryption key may be used to decrypt an encrypted program located at the processing apparatus.

The registration data includes a machine ID that is substantially unique to the corresponding processing apparatus; and the data processor is operable to produce the encrypted activated decryption key in response to the machine ID. Preferably, the data processor is further operable to produce a virtual ID as a function of the machine ID such that the virtual ID is associated with the machine ID, to encrypt the activated decryption key using the virtual ID, and to encrypt the virtual ID using the machine ID; and the network interface is further operable to facilitate the transmission of the encrypted virtual ID over the network to the processing apparatus.

In accordance with one or more further aspects of the present invention, an apparatus includes a network interface operable to provide communication with a network such that (i) respective machine IDs may be received over the network from processing apparatus, and (ii) registration data may be transmitted over the network to the respective processing apparatus in response to the machine IDs; and a database operable to store the received machine IDs, wherein the registration data may be used by the processing apparatus to obtain an encrypted decryption key and an encrypted virtual ID from a distributor over the network, the encrypted decryption key may be decrypted by the processing apparatus using the virtual ID, and the encrypted program may be decrypted by the processing apparatus using the decryption key.

In accordance with one or more further aspects of the present invention, one or more methods are contemplated that carry out one or more of the actions performed by the apparatus discussed above.

Further aspects, features, advantages, etc. of the invention will become apparent to one skilled in the art in view of the description herein taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

FIG. 2 is a conceptual block diagram and flow diagram illustrating certain process steps that are carried out by certain portions of the system of FIG. 1;

FIG. 3 is a further conceptual block diagram and flow diagram illustrating further steps that are carried out by certain portions of the system of FIG. 1;

FIG. 4 is a flow diagram showing certain process steps carried out in accordance with the invention as illustrated in FIG. 3;

FIG. 7 is a block diagram illustrating certain database content in accordance with the present invention;

FIG. 10 is a block diagram illustrating certain database content in accordance with the present invention;

FIG. 16 is a block diagram of certain database content in accordance with one or more aspects of the present invention;

FIG. 17 is a block diagram illustrating further features of the database content of FIG. 16.

DETAILED DESCRIPTION OF PREFERRED EMBODIMENTS

Figure 1:
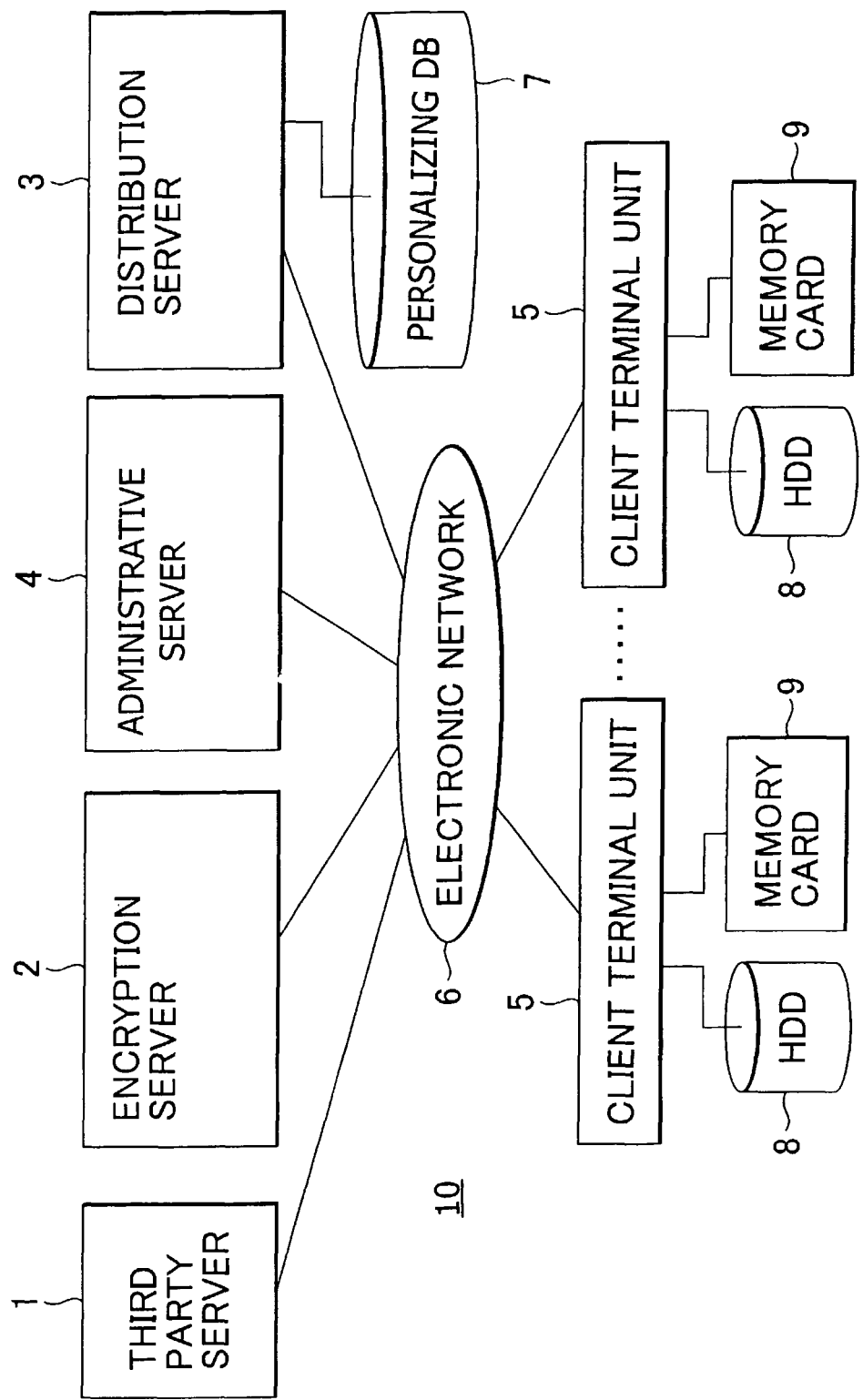
FIG. 1 is a block diagram of a system for distributing program content to one or more users in accordance with one or more aspects of the present invention.

With reference to the drawings, wherein like numerals indicate like elements, there is shown in FIG. 1 a system 10 that is operable to distribute program content to a plurality of end-users in a secure manner, e.g., such that unauthorized copies of the program content are either prevented or rendered useless. The system 10 preferably includes a third party server 1, an encryption server 2, a distribution server 3, an administrative server 4, and a plurality of client terminal apparatus 5, all coupled to a network 6, such as the Internet. It is noted that the system 10 may include a plurality of third party servers 1, a plurality of encryption servers 2, a plurality to distribution servers 3, and/or a plurality of administrative servers 4 without departing from the scope of the invention. For brevity and clarity, only one of each such servers will be discussed herein. Each of the servers 1, 2, 3, 4 is preferably maintained by, controlled by, and/or otherwise associated with an entity or person. It is noted that reference may be made herein to the server and the entity associated therewith interchangeably.

The third party server 1 is preferably controlled by, maintained by, and/or otherwise associated with an entity, such as a developer of program content. By way of example, the third party server 1 may be a developer of computer application programs, computer system programs, etc. The third party server 1 may be implemented utilizing any of the known (or hereinafter developed) hardware for carrying out server related functions.

The encryption server 2 is preferably controlled by, maintained by, and/or otherwise associated with an entity charged with administrative functions (that will be discussed in greater detail later herein). Preferably, this entity is the same entity as that of the administrative server 4. It is noted, however, that the encryption server 2 may be associated with another entity without departing from the scope of the invention. The encryption server 2 may be implemented utilizing any of the known (or hereinafter developed) hardware for carrying out server related functions.

The distribution server 3 is preferably controlled by, maintained by, and/or otherwise associated with an entity charged with distributing the program content to the client terminal apparatus 5, such as by way of the network 6. It is understood, however, that the program content may be distributed by other means, such as by storage media. The distributor server 3 is preferably coupled to a personalizing database 7, which will be discussed in detail later herein. The distributor server 3 and personalizing database 7 may be implemented utilizing any of the known (or hereinafter developed) hardware suitable for carrying out network server functions and database functions.

The administrative server 4, is preferably maintained by, controlled by, and/or otherwise associated with an entity charged with performing certain administration functions (which will be discussed in greater detail later in this description). The administrative server 4 may be implemented utilizing any of the known (or hereinafter developed) hardware suitable for carrying out network server functions and database functions.

As will become evident from the description herein, the respective functions carried out by the third party server 1, the encryption server 2, the distributor server 3, and the administrative server 4 may be distributed among one or more servers and/or one or more entities controlling, maintaining, and/or being otherwise associated with those servers. Indeed, separate entities for each server are not required, e.g., one entity may be associated with the encryption server 3 and the administrative server 4. The distribution, however, is preferably consistent with that illustrated in FIG. 1.

Generally, each of the client terminal apparatus 5 is preferably operably coupled to a hard disk drive 8, such as any of the known hard disk drive hardware, and a memory card 9, such as the Sony Memorystick. While the hard disk drive 8 and memory card 9 (which is preferably removably coupled to the client terminal apparatus 5) are shown as separate items from the apparatus 5, it is understood that they may be integrally located with the apparatus 5 without departing from the spirit and scope of the invention. The client terminal apparatus 5 may be implemented utilizing any of the known hardware, such as a personal computer, the Sony PlayStation 2, etc.

In accordance with one or more aspects of the present invention, the client terminal apparatus 5 is preferably operable to receive a source encrypted program, such as a computer application program, by way of a storage media, such as a CD-ROM, DVD-ROM, electronic memory, etc., or by way of downloading the program content over the network 6. While the source encrypted computer program may be obtained from any authorized entity without departing from the spirit and scope of the invention, it is preferred that the client terminal apparatus 5 receives the source encrypted computer program from the distribution server 3 (e.g., by way of downloading over the network 6) or from a brick-and-mortar distributor working in direct and/or indirect association with the software developer and/or the distribution server 3. Again, it is not required that the client terminal apparatus 5 receive the source encrypted computer program from a particular entity; indeed, it may be received from the administrative server 4, the third party server 1, or another entity.

Advantageously, the end-user receives the computer program in a form (i.e., source encrypted) in which he or she cannot execute the program on the client terminal apparatus 5 without first obtaining a decryption key and decrypting the source encrypted computer program. Further, if the source encrypted computer program is obtained by way of an authorized copy thereof, the offending end-user would be incapable of executing the program without first obtaining the decryption key. As will be discussed in more detail below, the decryption key may only be obtained by an authorized client terminal apparatus 5.

Reference is now made to FIG. 2, which is a conceptual block diagram and flow diagram illustrating certain process steps performed by the encryption server 2 and the third party server 1. This figure provides an example of how the source encrypted computer program is generated. In this example, the third party server 1 is associated with a software developer, that either itself or in conjunction with another entity obtains program content, such as a computer system program, a computer application program, etc. As shown in FIG. 2, the third party server 1 contains at least one system program and at least one application program. One or more of these programs are transmitted to the encryption server 2 over the network 6. It is noted, however, that the program content may be manually provided to the encryption server 2, e.g., by way of storage media.

The encryption server 2 preferably encrypts the program content and returns the encrypted program content to the third party server 1. The encryption process may employ any of the known encryption techniques, such as public key encryption, symmetric key encryption, etc., in order to produce the encrypted program content. In this example, the encryption server 2 has returned an encrypted system program (a source encrypted system program) and an encrypted application program (a source encrypted application program) to the third party server 1. Although it is not required to practice the invention, the encryption server 2 may provide the decryption key, which is capable of decrypting the encrypted program content, to the third party server 1. Preferably, the decryption key is provided to the distribution server 3 in a non-activated state, i.e., in a way in which it may not be readily used to decrypt the source encrypted computer program. For example, the decryption key may be initially encrypted an entity such as by the encryption server 2 such that it is non-active. As will be discussed later herein, this provides an advantageous level of security.

As will be discussed hereinbelow, the third party server 1 may distribute the encrypted program content to the distribution server 3 manually by way of storage media, or by way of an electronic download over the network 6. Irrespective of how the source encrypted program content is distributed, the end-user preferably cannot execute the program content without performing certain registration steps, which will be discussed hereinbelow.

Reference is now made to FIG. 3, which is a conceptual block diagram and flow diagram illustrating certain process steps that are preferably carried out between the distribution server 3 and the administrative server 4. The distribution server 3 preferably establishes a communication link with the administrative server 4 over the network 6. The administrative server 4 preferably transmits a key distribution program 11, key management data 12, and a key registration program 13 to the distribution server 3 over the network 6. As will be discussed later herein, the key distribution program 11 is executed by the distribution server 3 in order to permit distribution of the decryption keys to end-users. The key management data is preferably a secure collection of information, including a distribution ID, which is preferably substantially unique to each distribution server 3. As will be discussed in more detail hereinbelow, the key registration program 13 is preferably executed by the distribution server 3 in order to convert the non-active decryption key into an active decryption key (i.e., usable to decrypt the source encrypted computer program).

Reference is now made to FIG. 4, which is a flow diagram illustrating further process steps that are preferably carried out between the distribution server 3 and the administrative server 4. In general, the distribution server 3 may make an activation request to the administrative server 4 over the network 6 and receive activation grant information from the administrative server 4 in response. More particularly, at action S1, the distribution server 3 preferably connects to the administrative server 4 over the network 6. At action S2, the distribution server 3 transmits the key management data (which includes the distributor ID therein) to the administrative server 4.

At action S3, the administrative server 4 preferably authenticates the distribution server 3 utilizing a suitable authentication process. For example, the administrative server 4 may require that the distribution server 3 provide a user ID, password, etc, or some other verifiable information in order to permit authentication. It is preferred, however, that the administrative server 4 extracts the distributor ID from the key management data 12 in order to authenticate the distribution server 3. At action S4, a determination is made as to whether the authentication is successful. If authentication is not successful, then the process advances to action S5, where no activation is permitted and the process terminates. If authentication is successful, then the process flow preferably advances to action S6, where activation grant information is transmitted from the administrative server 4 to the distribution server 3 over the network 6.

At action S7, the distribution server 3 preferably activates the decryption key associated with the source encrypted computer program. More particularly, the distribution server 3 preferably executes the key registration program 13, which requires the activation grant information as input. In response, the key registration program 13 activates the decryption key such that it may be used to decrypt the source encrypted computer program. By way of example, the activation grant information may include a decryption key that is suitable for decrypting an initially encrypted decryption key. In this scenario, the key registration program 13 includes a decryption capability that utilizes the activation grant information to decrypt the initially encrypted decryption key.

Irrespective of how or whether the decryption key is activated, the distribution server 3 preferably stores the decryption key in the personalizing database 7. At this stage, the distribution server 3 contains (or has access to) the source encrypted computer program and the decryption key capable of decrypting such program.

Figure 5:
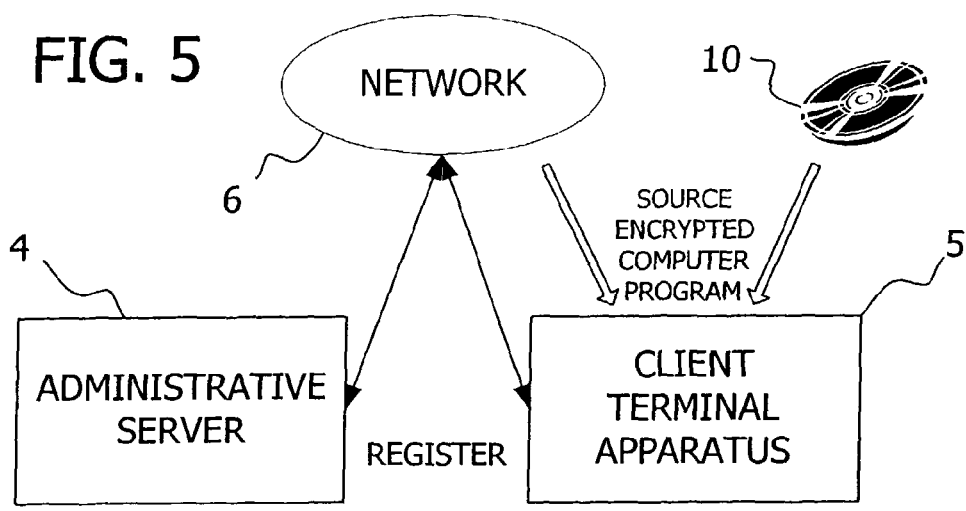
FIG. 5 is a conceptual block diagram and flow diagram illustrating certain process steps carried out by, for example, the administrative server and client terminal of FIG. 1.

Reference is now made to FIG. 5, which is a conceptual block diagram and flow diagram illustrating certain process steps that are preferably carried out in order to process the source encrypted computer program. As shown in FIG. 5, the client terminal apparatus 5 has preferably received the source encrypted computer program either by way of a downloading operation over the network 6 or by way of a storage medium, such as a CD-ROM 10. It is preferred that the client terminal apparatus 5 has obtained the source encrypted computer program from the distribution server 3. In order to execute the source encrypted computer program, however, the client terminal apparatus 5 must perform certain registration steps. These steps are preferably illustrated with the administrative server 4 over the network 6.

Figure 6:
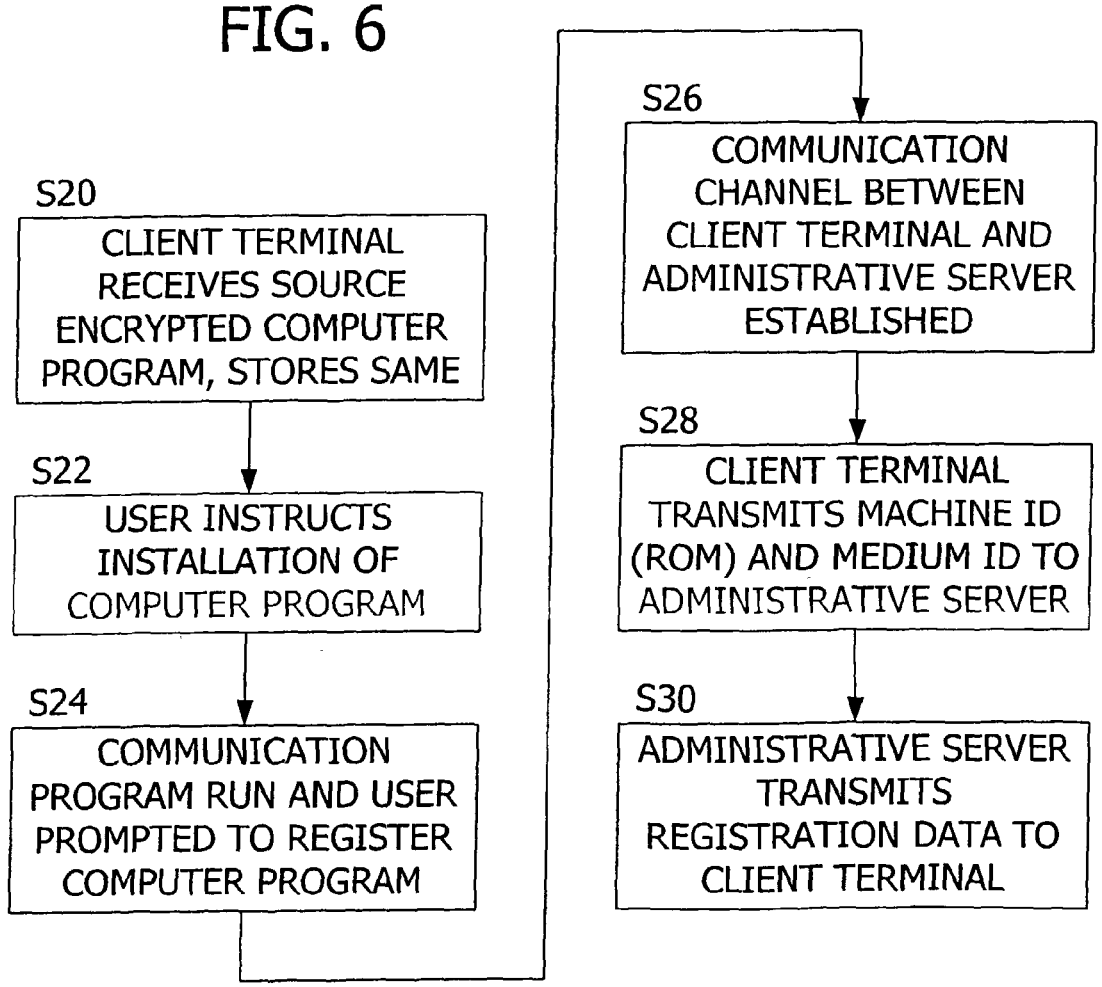
FIG. 6 is a flow diagram illustrating further process steps carried out by the apparatus of FIG. 5.

At least some of the steps in the registration process are illustrated in the flow diagram of FIG. 6. At step S20, the client terminal apparatus 5 receives the source encrypted computer program and stores same as discussed hereinabove. At step S22, the user preferably provides an instruction indicating that he or she wishes to install the computer program and make it ready for execution. In this regard, the client terminal apparatus 5 preferably includes a computer program that is invoked in response to the user's installation instruction. This program prompts the user to register the source encrypted computer program and invokes a communication feature (step S24).

It is noted that the client terminal apparatus 5 preferably includes a network interface, which is operable to provide communications over the network 6 as is known in the art; indeed, any of the known network interface hardware may be employed for this purpose. At step S26, a channel of communication is preferably initiated by the client terminal apparatus 5 and established between the apparatus 5 and the administrative server 4. The network interface of the client terminal apparatus 5 is preferably operable to facilitate the transmission of at least some identification information related to the apparatus 5 to the administrative server 4 over the network 6. In particular, the identification information preferably includes a machine ID that is substantially unique to the client terminal apparatus 5. The identification information may also include the distributor ID, which indicates the source entity (distribution server 3) from which the source encrypted computer program was obtained.

It is most preferred that the client terminal apparatus 5 include a first storage device, such as the hard disk drive 8, the memory card 9, etc. operable to store the source encrypted computer program and certain other information that will be discussed hereinbelow, and a second storage device, such as a read only memory (ROM) that is operable to store the machine ID. The network interface of the client terminal apparatus 5 is preferably further operable to transmit the machine ID (from the ROM) over the network 6 to the administrative server 4 (action S28).

At action S30, the administrative server 4 preferably generates and transmits registration data to the client terminal apparatus 5 over the network 6. By way of example, the registration data may be formed from the machine ID and the distributor ID, preferably such that these IDs may be identified later by appropriate analysis of the registration data. Upon receipt of the registration data, the client terminal apparatus stores same, preferably in the first storage device, e.g., the hard disc drive and/or the memory card 9.

With reference to FIG. 7, it is noted that the administrative server 4 may be coupled to a database 7A. The database 7A may contain any device IDs and/or distributor IDs received during the above-described phase of the registration process. Preferably, the device IDs and distributor IDs are stored in association with one another such that useful history data and analysis thereof may be obtained. For example, it may be determined from such analysis that certain client terminal apparatus 5 have received source encrypted computer programs from certain distribution servers 3. Taken in conjunction with data obtained from the distribution servers 3 (discussed further later herein) the device IDs, distributor IDs, and/or the associations therebetween may be used to ensure that any obligations (e.g., by way of contract) on the part of the distribution server 3 are being met.

Figure 8:
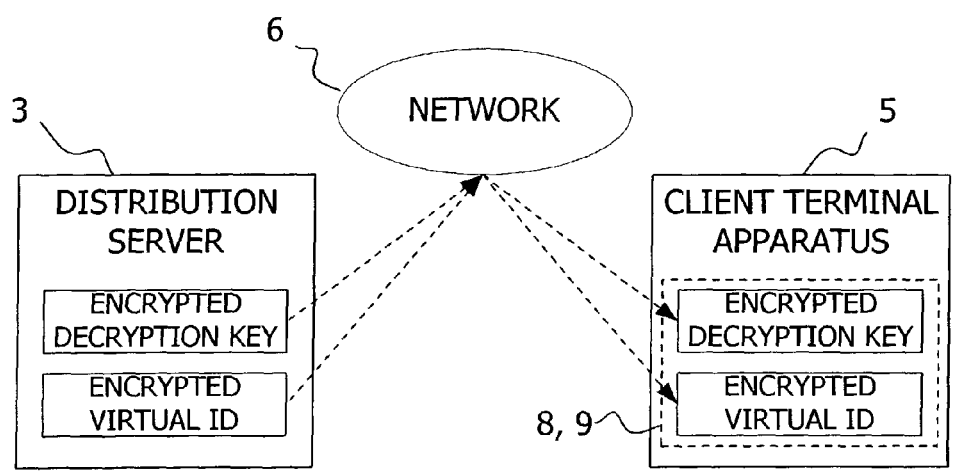
FIG. 8 is a further conceptual block diagram and flow diagram illustrating certain process steps carried out by portions of the system of FIG. 1.
Figure 9:
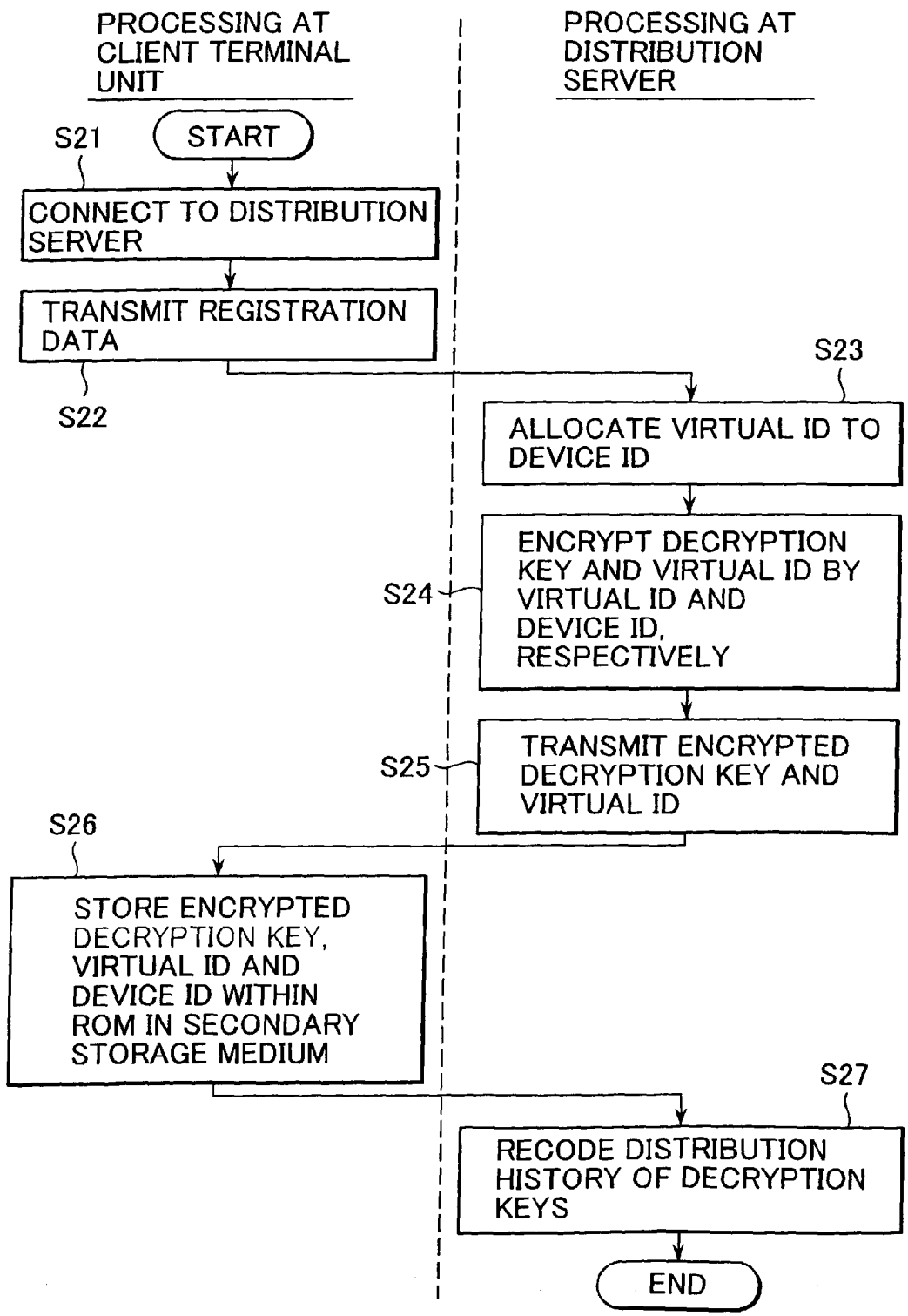
FIG. 9 is a flow diagram illustrating further process steps carried out by the apparatus of FIG. 8.

Reference is now made to FIGS. 8 and 9, which are respectively a conceptual block diagram and a flow diagram illustrating further process steps that are preferably carried out in order to register the computer program and permit the end-user to execute same. The user preferably provides an instruction to the client terminal apparatus 5 indicating a desire to obtain a decryption key suitable to decrypt the source encrypted computer program. At step S21, the client terminal apparatus 5 establishes a communication link with the distribution server 3 over the network 6. Thereafter, the client terminal apparatus 5 transmits the registration data (previously obtained from the administrative server 4) to the distribution server 3 (action S22).

At action S23, the distribution server 3 receives the registration data, e.g., containing the machine ID (and possibly the distributor ID) from the client terminal apparatus 5 over the network 6. In this regard, the distribution server 3 preferably includes a network interface operable to facilitate communication with the network 6 such that the registration data may be received over the network 6 from the client terminal apparatus 5. At step S23, the administrative server 4 also assigns another ID, called a virtual ID herein, that preferably corresponds with the machine ID received from the client terminal apparatus 5. It is noted that the virtual ID may be selected from a plurality of preexisting IDs, the virtual ID may be derived through numeric operations performed on the machine ID, the distributor ID, and/or some other operand, or any other known or hereinafter developed technique may be employed to generate the virtual ID.

The distribution server 3 searches the personalizing database 7 for an existing machine ID that matches the machine ID received from the client terminal apparatus 5 (i.e., the machine ID stored in the second storage device (ROM) thereof). With reference to FIG. 10, the personalizing database 7 is preferably operable to store respective machine IDs, each ID corresponding with a respective one of the client terminal apparatus 5. As illustrated in FIG. 10, a plurality of machine IDs are prestored in the personalizing database 7, e.g., in the left column of FIG. 10. It is preferred that each of these machine IDs corresponds with a given one of the client terminal apparatus 5 and that such machine IDs are substantially unique to the respective client terminal apparatus 5. The distribution server 3 also preferably includes a data processor operable to search the personalizing database 7 for the registration information (e.g., the machine ID) that matches the machine ID received from the client terminal apparatus 5 over the network 6. Any of the known or hereinafter developed data processing hardware may be employed for this purpose.

Referring again to FIG. 9, at step S23, the virtual ID is associated with the machine ID stored in the personalizing database 7, which is to say that the virtual ID is associated with the particular client terminal apparatus 5 that transmitted the received machine ID to the distribution server 3. This association is preferably achieved by storing the virtual ID within the personalizing database 7 in a manner such that it corresponds with the stored machine ID. For example, if the received machine ID from the client terminal apparatus 5 were K2345 (FIG. 10) and the generated virtual ID were B5678, then the association of the virtual ID B5678 with the machine ID K2345 may be achieved by storing the virtual ID B5678 in a position within the personalizing database 7 that corresponds with (or is linked to) the stored machine ID K2345. Similarly, if the received machine ID were K6789 and the generated virtual ID were B9012, then the association of the virtual ID B9012 with the machine ID K6789 may be achieved by storing the virtual ID B9012 in a position within the personalizing database 7 that is associated with the machine ID K6789.

It is noted that the "--" in the virtual ID positions opposite machine ID K1234 and K0987 indicate that the corresponding client terminal apparatus 5 have not yet been purchased by end-users or that such end-users have not yet registered computer programs with the distribution server 3.

As noted above, the registration data transmitted from the client terminal apparatus 5 to the distribution server 3 over the network 6 (step S22, FIG. 9) may include the transmission of the distributor ID that corresponds with the distribution server 3 from which the source encrypted computer program was obtained. In an alternative embodiment of the invention, the distributor ID contained within the registration data may also be stored in the personalizing database 7 in association with the machine ID.

With reference to FIG. 9, the distribution server 3 is preferably operable to produce an encrypted decryption key and an encrypted virtual ID, where the decryption key is operable for use in decrypting the source encrypted computer program at the client terminal apparatus 5. It is noted that the distribution server 3 may have access to any number of decryption keys that may be used to decrypt respective source encrypted computer programs produced by the encryption server 2 (FIGS. 1-2). These decryption keys may be provided to the distribution server 3 by the encryption server 2 and/or by any other appropriate entity. Furthermore, these decryption keys may be transmitted to the distribution server 3 by way of the network 6, by way of another network, or may be manually provided by way of storage media, etc.

At step S24, the distribution server 3 preferably encrypts the decryption key using the virtual ID associated with the client terminal apparatus 5. Further, the distribution server 3 preferably encrypts the virtual ID using the associated machine ID of the client terminal apparatus 5, each of which is preferably obtained from the personalizing database 7.

The network interface of the distribution server 3 is preferably further operable to facilitate the transmission of the encrypted decryption key and the encrypted virtual ID to the client terminal apparatus 5 over the network 6 (step S25). At step S26, the client terminal apparatus 5 preferably receives the encrypted decryption key and the encrypted virtual ID over the network 6 and stores same in the first storage device (e.g., the hard disk drive 8, the memory card 9, etc.). At action S27, the distribution server 3 preferably records (as history data) that a particular decryption key was transmitted to a client terminal apparatus 5. This information is preferably later provided to the administrative server 4, e.g., over the network 6. Preferably, the distribution server 3 is not capable of accessing the data contained in the history data. This data may be used for billing purposes, for tracking of obligations, etc.

Advantageously, the encrypted decryption key is only provided to an authorized client terminal apparatus 5, e.g., a client terminal apparatus 5 that has provided a valid machine ID and has registered such machine ID in association with a virtual ID used to encrypt the decryption key. Furthermore, any interception of the encrypted decryption key, such as by way of network piracy or unauthorized duplication, will fail to provide the necessary information (i.e., a usable decryption key) to decrypt the source encrypted computer program. Indeed, such decryption key is encrypted with a substantially unique virtual ID. Similarly, the encrypted virtual ID is provided to the client terminal apparatus 5 only after the registration process has been completed and the client terminal apparatus 5 has been deemed authorized. As the virtual ID is transmitted from the distribution server 3 to the client terminal apparatus 5 in an encrypted manner (i.e., encrypted using the machine ID of the client terminal apparatus 5), any unauthorized acquisition of the encrypted virtual ID will not yield the necessary information to decrypt the encrypted decryption key.

Figure 11:
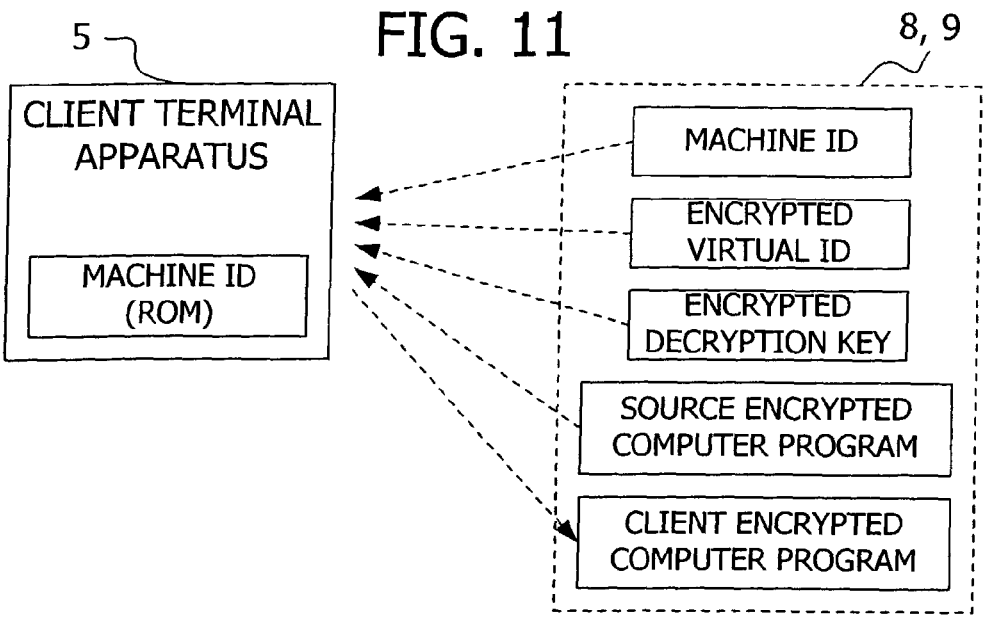
FIG. 11 is a further conceptual block diagram and flow diagram illustrating one or more further process steps carried out by, for example, the client terminal of FIG. 1.
Figure 12:
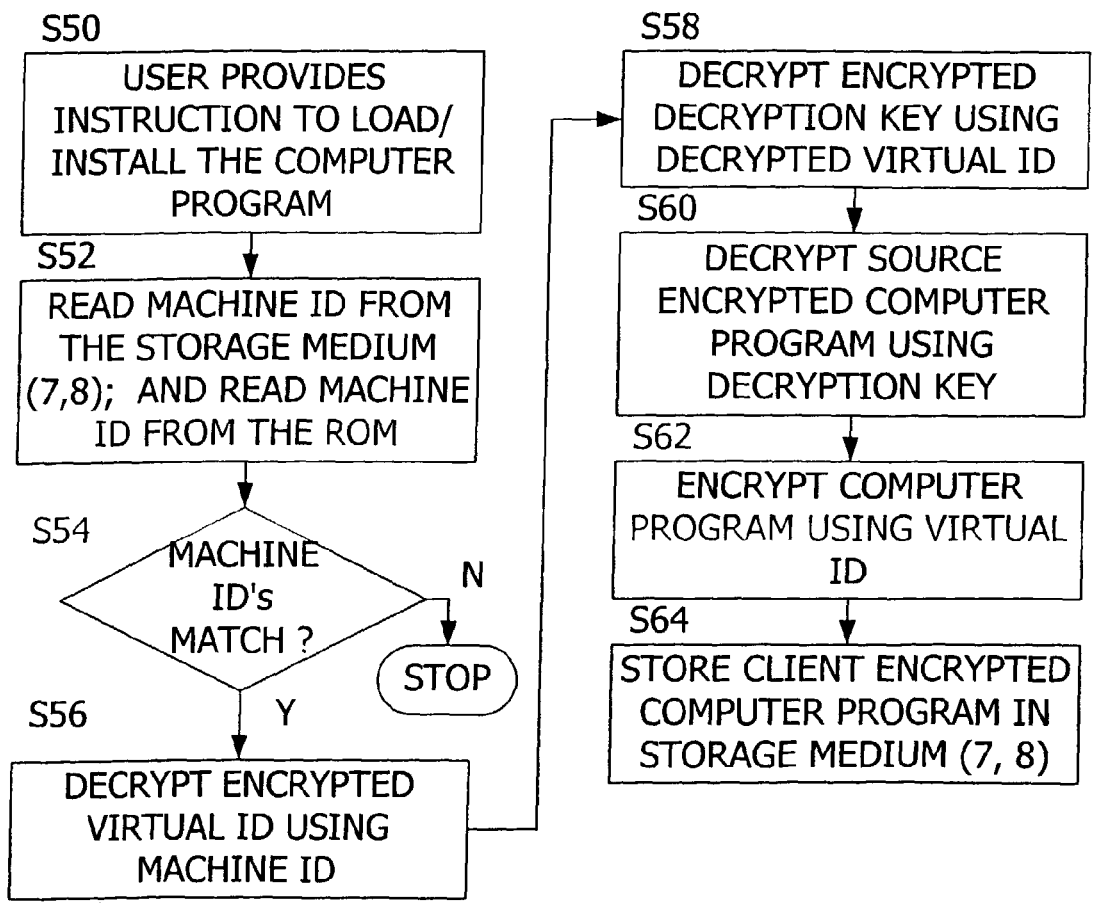
FIG. 12 is a flow diagram illustrating further process steps carried out in accordance with FIG. 11.

Reference is now made to FIGS. 11 and 12, which illustrate certain processes that are carried out in order to load/install the source encrypted computer program within the client terminal apparatus 5. FIG. 11 illustrates that the client terminal apparatus 5 is separate from the first storage device, e.g., the hard disk drive 8, the memory card 9, etc. As discussed above, however, these elements may be integrated or semi-integrated without departing from the spirit and scope of the invention as claimed. It is noted that at this stage of the process, the client terminal apparatus 5 includes the machine ID stored in the second storage device, e.g., the ROM, and the first storage device 8, 9 contains the following items: the machine ID, the encrypted virtual ID, the encrypted decryption key, and the source encrypted computer program.

At step S50 (FIG. 12), the user may provide an instruction to the client terminal apparatus 5 to load/install the source encrypted computer program for future use. In response, the client terminal apparatus 5, using appropriate hardware and software processes, reads the machine ID from the first storage device 8, 9 and reads the machine ID from the second storage device, e.g., the ROM (step S52). At step S54, a determination is made as to whether these machine IDs match. If they do not, then the process terminates and/or enters an alternative process. If they match, however, the process flow advances to step S56, where the encrypted virtual ID is decrypted using the machine ID (preferably the machine ID that was stored in the ROM). Once the virtual ID is obtained, the encrypted decryption key is decrypted using the virtual ID (step S58). Next, the source encrypted computer program is decrypted using the decryption key (step S60). At step S62, the computer program is re-encrypted using the virtual ID obtained at step S56 to obtain a client encrypted computer program. The client encrypted computer program is stored in the first storage device 8, 9 (step S64). At this stage, neither the encrypted decryption key nor the source encrypted computer program need be retained in the first storage device 8, 9.

The client terminal apparatus 5 preferably includes a decryption device and an encryption device in order to execute the encryption and decryption functions discussed hereinabove. The decryption and encryption devices may be integrated together and for simplicity called a decryption device. Any of the known or hereinafter developed hardware and/or software for performing such encryption and decryption may be employed in accordance with the invention. For example, a decryption library, an encryption library, etc., may be employed.

Advantageously, the client encrypted computer program is secure because (as will be explained hereinbelow) unauthorized copies thereof cannot be executed by unauthorized end-users on different client terminal apparatus 5. Indeed, the client encrypted computer program must first be decrypted, which as will be explained hereinbelow cannot be performed on any other client terminal apparatus 5 other than the one that registered the computer program with the distribution server 3.

Figure 13:
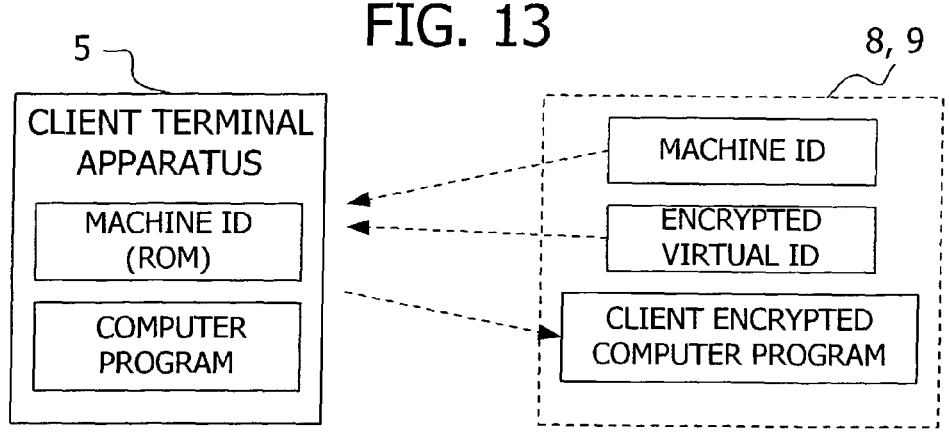
FIG. 13 is a conceptual block diagram and flow diagram illustrating further process steps carried out by the client terminal of the present invention.
Figure 14:
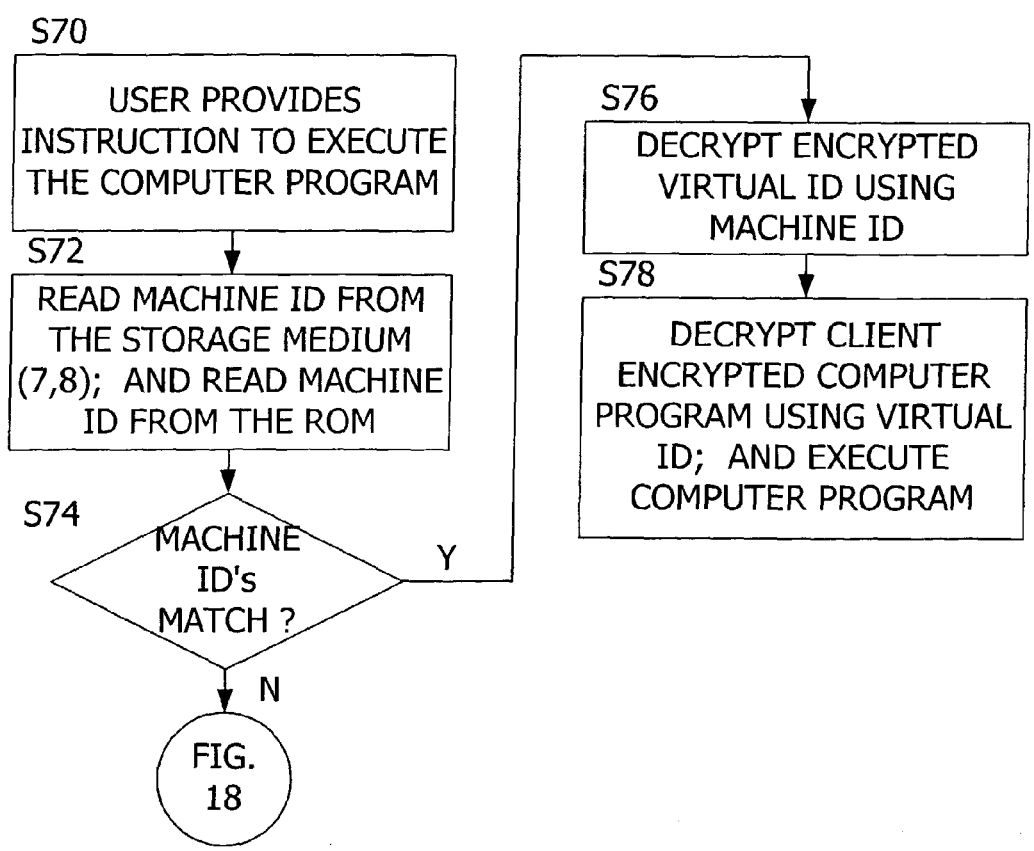
FIG. 14 is a flow diagram illustrating further details concerning the process steps of FIG. 13.

With reference to FIGS. 13 and 14, the process by which the computer program is executed by the client terminal apparatus 5 will now be discussed. At this stage in the process, the client terminal apparatus 5 includes the second storage device, e.g., the ROM, containing the machine ID and the first storage device 8, 9 containing the machine ID, the encrypted virtual ID, and the client encrypted computer program.

At step S70, the user may provide an instruction to the client terminal apparatus 5 to execute the computer program. In response, the client terminal apparatus, operating under the control of an appropriate computer program, reads the machine ID from the first storage device 8, 9 and reads the machine ID from the second storage device (ROM) (step S72). At step S74 a determination is made as to whether the machine IDs match one another. If not, the process flow advances to a re-registration process that will be discussed in more detail hereinbelow with respect to FIGS. 15-18. If the machine IDs match, the process flow advances to step S76, where the decryption device of the client terminal apparatus 5 decrypts the encrypted virtual ID using the machine ID (preferably the machine ID that is contained in the ROM). At step S78, the decryption device of the client terminal apparatus 5 decrypts the client encrypted computer program using the virtual ID obtained at step S76. At this point, the client terminal apparatus 5 may execute the computer program, which is resident in RAM.

Advantageously, the client encrypted computer program may only be decrypted using the client terminal apparatus 5 that is associated with the virtual ID used to encrypt the client encrypted computer program. Thus, if unauthorized copies of the client encrypted computer program are provided to non-authorized end-users, the apparatus on which such unauthorized end-users would attempt to execute the computer program would not be capable of decrypting the client encrypted computer program. Further, if the first storage device 8, 9 were provided to an unauthorized enduser (e.g., such that the storage device 8, 9 were coupled to a different client terminal apparatus 5), the encrypted virtual ID could not be decrypted inasmuch as any machine ID stored in ROM would not match the machine ID contained in the first storage device 8, 9. Thus, the client encrypted computer program could not be decrypted. This novel approach to the secure distribution of computer programs ensures that unauthorized copies of the computer program are rendered useless and that only a particular client terminal apparatus 5 is capable of executing the computer programs.

As discussed above, the computer program may be an application program, such as a video game, a word processing program, a spread sheet, etc. or the computer program may be a system program, such as an operating system (OS), boot program, etc.

As discussed hereinabove with respect to FIGS. 13 and 14, when the user desires to execute the client encrypted computer program, a determination is made at step S74 as to whether the machine ID contained in the first storage device 8, 9 matches the machine ID stored in the second storage device (ROM) of the client terminal apparatus 5. If the machine IDs do not match, then the process flow branches to a re-registration process that will now be described with reference to FIG. 15.

It is noted that these machine IDs would not match if the client terminal apparatus 5 were improperly modified to connect with the storage device 8, 9 of a different client terminal apparatus 5. Alternatively, the machine IDs would be different if the client terminal apparatus 5 were repaired and the machine ID stored in the second storage device ROM were changed in accordance with the repair. Still further, these machine IDs would be different if a user were to replace his or her client terminal apparatus 5 with a new client terminal apparatus 5 for one reason or another and to retain the first storage device 8, 9, for example, because it contained one or more client encrypted computer programs. In any event, a re-registration (or updated registration) process is contemplated in accordance with the present invention because if the machine IDs do not match, the user would not be capable of executing the computer programs contained on the first storage device 8, 9 even if such computer programs were obtained in an authorized manner. Of course, the user could re-install the computer programs (assuming that they were readily available in their initial source encrypted form), however, this relatively difficult process can be avoided in accordance with the present invention.

Figure 15:
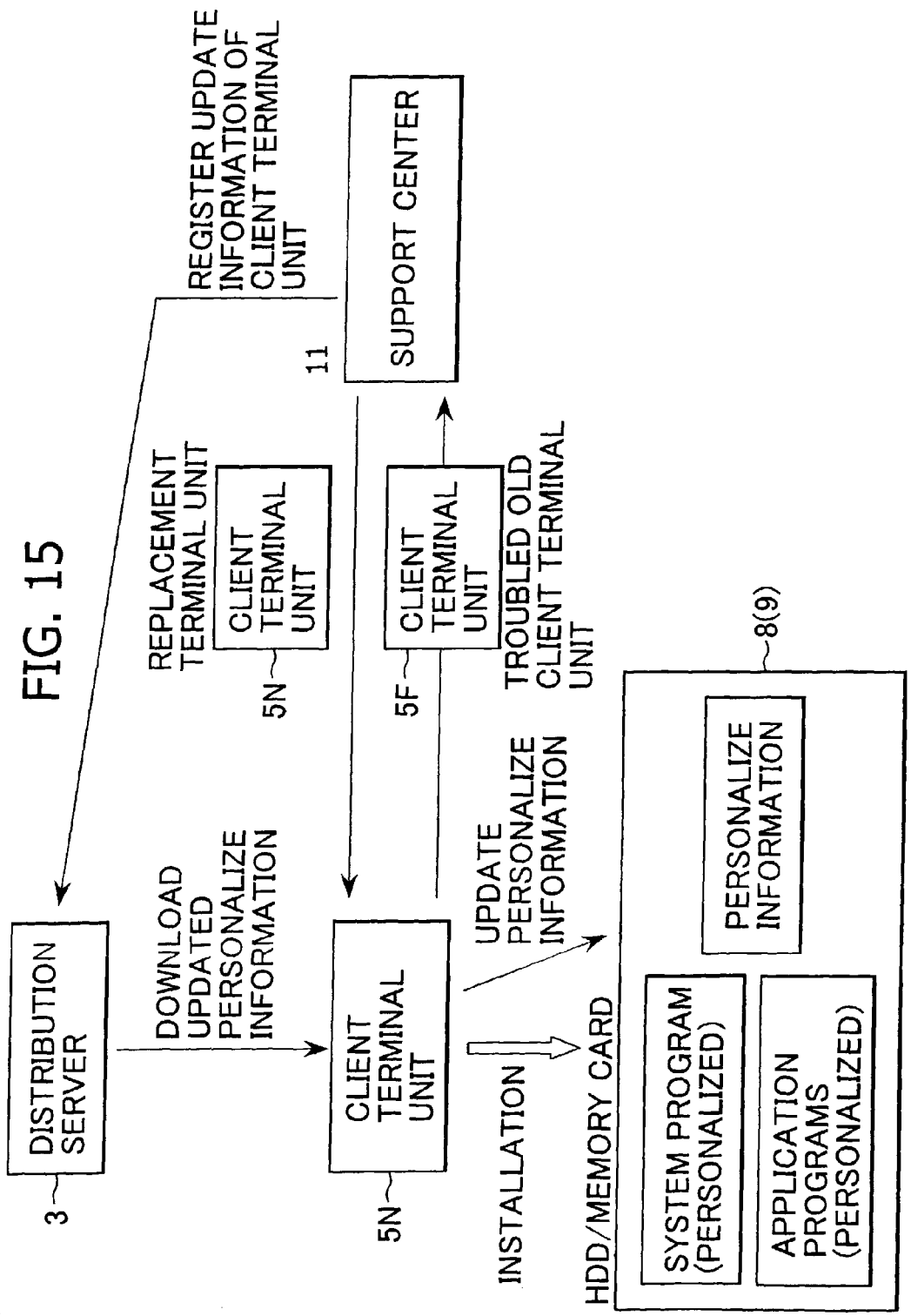
FIG. 15 is a conceptual block diagram and flow diagram illustrating further aspects of the present invention.

Before discussing the core details of FIG. 15, it is noted that the first storage device 8, 9 is shown as containing computer programs and data that are labeled slightly differently than in previous figures. In particular, the first storage device 8, 9 contains a personalized system program, a personalized application program, and personalizing information. It is noted that the personalized system program and personalized application program corresponds with the client encrypted computer program discussed hereinabove. The personalizing information corresponds with one or more of the machine ID, distributor ID, encrypted virtual ID, etc.

Turning now to further details of FIG. 15, a process is illustrated in which an old or failed client terminal apparatus 5F is provided to a support center 11, where repairs or replacement is made and a new client terminal apparatus 5N is provided to the user. Preferably, the support center 11 transmits the old machine ID from the failed terminal apparatus 5F as well as the new machine ID from the new client terminal apparatus 5N to the distribution server 3.

With further reference to FIGS. 16 and 17, the distribution server 3 preferably receives the old machine ID from the failed terminal apparatus 5F as well as the new machine ID from the new client terminal apparatus 5N. The distribution server 3 then accesses the personalizing database 7 and searches for the machine ID of the old client terminal apparatus 5N, e.g., machine ID K6789 in order to obtain the associated virtual ID B9012 (and possibly the medium ID M2468). Next, the machine IDs stored in the personalizing database 7 are searched to find the new machine ID K1143 of the new client terminal apparatus 5N. Next, the virtual ID B9012 associated with the old machine ID K6789 is associated with the new machine ID K1143 (and the old medium ID may also be associated therewith). At this stage in the process, the distribution server 3 is ready for the user to update his or her registration information.

Figure 18:
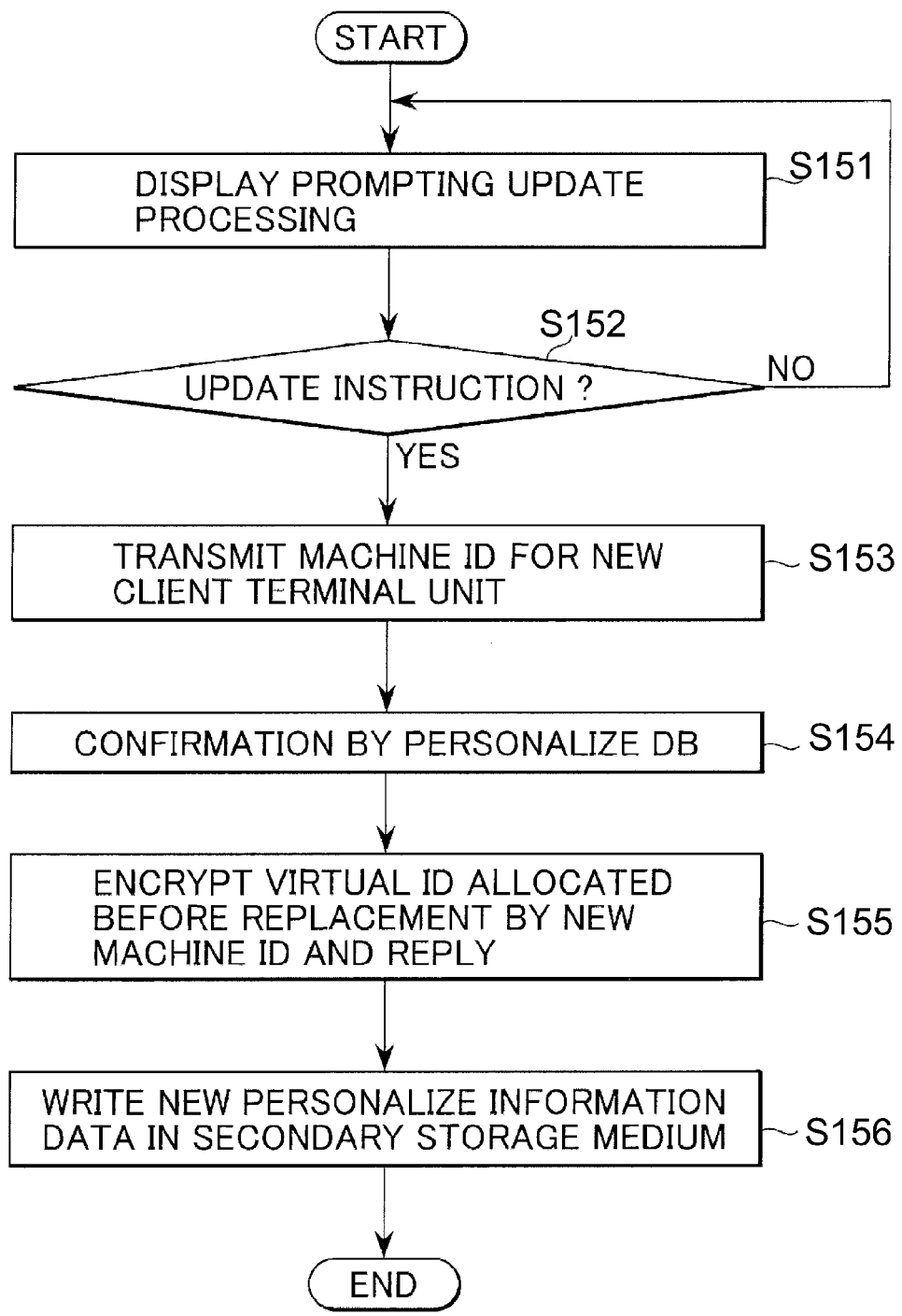
FIG. 18 is a flow diagram illustrating further details of the process steps of FIG. 15.

Recall that when a user instructs the client terminal apparatus 5N to execute a computer program residing in the first storage device 8, 9, a determination is made as to whether the respective machine IDs stored in the first storage device 8, 9 and the second storage device (ROM) match (steps S70-S74, FIG. 14). With further reference to FIG. 18, when it is determined that the machine IDs do not match (step S74, FIG. 14) the user is preferably prompted to update his or her registration information with the distribution server 3 (step S151). At step S152, a determination is made as to whether the user has instructed the client terminal apparatus 5 to execute the registration update process. If such instructions have not been received, then the process flow preferably loops back to step S151, where the user is again prompted to update the registration information. Once the user has provided instructions to update the registration information, the process preferably advances from step S152 to step S153, where the machine ID contained in the second storage device (ROM) of the new client terminal apparatus 5N is transmitted (by way of the network interface thereof) to the distribution server 3 over the network 6. At step S154, the administrative server confirms this information by way of accessing the personalizing database 7. Thereafter, the old virtual ID (which was originally associated with the old client terminal apparatus 5F) is encrypted utilizing the new machine ID (K1143) and transmitted (e.g., by way of the network interface of the distribution server 3) to the new client terminal apparatus 5N over the network 6.

At step 5156, the new client terminal apparatus 5N receives the new encrypted virtual ID (personalizing information data) and stores same in the first storage device 8, 9, preferably in a way that replaces the encrypted old virtual ID. This completes the registration update process.

Advantageously, the client encrypted computer program, which was originally utilized by way of the failed client terminal apparatus 5F may be decrypted utilizing the new encrypted virtual ID because the new encrypted virtual ID contains the same virtual ID as the old encrypted virtual ID. Stated another way, the only difference between the old encrypted virtual ID and the new encrypted virtual ID is the machine ID used to encrypt the virtual ID. In order for the user to execute the client encrypted computer program on the new client terminal apparatus 5N, the process steps discussed hereinabove with respect to FIGS. 13 and 14 may be performed.

Figure 19:
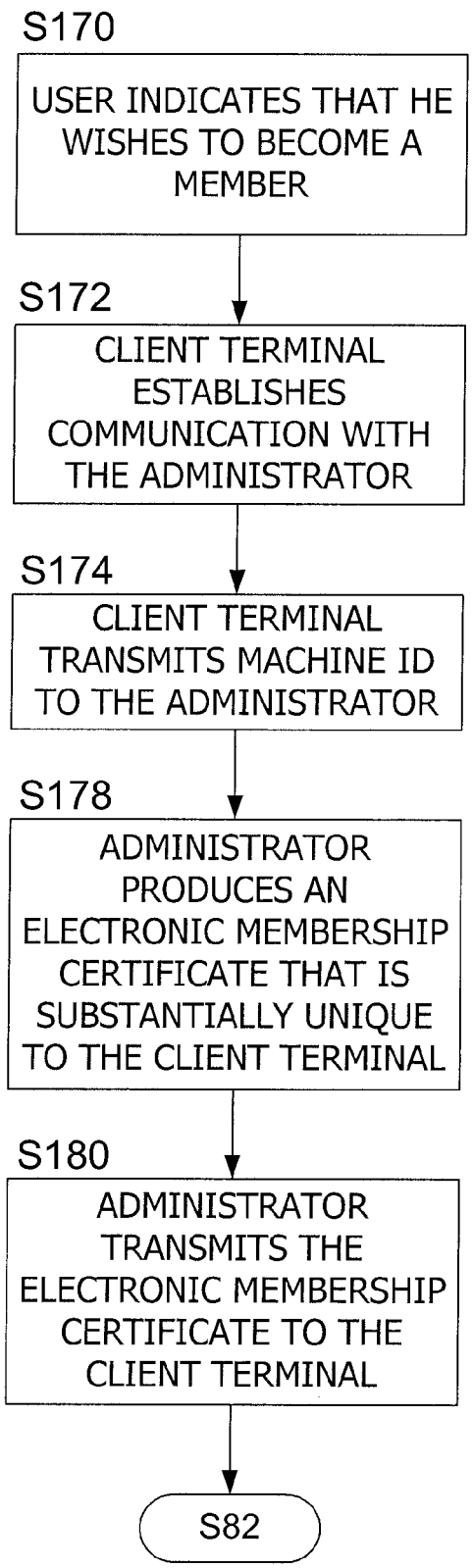
FIG. 19 is a flow diagram illustrating one or more further aspects of the present invention.

Reference is now made to FIG. 19, which is a process flow diagram illustrating one or more aspects of another embodiment of the present invention. This embodiment of the present invention contemplates the secure distribution of program content from a distributor of rental program content. The distributor of rental program content may be the third party server 1, the administrative server 4, the distribution server 3, or some other server (not shown). When a user of the client terminal apparatus 5 desires to rent program content, the user is preferably required to become a member of the rental system. In this regard, at step S170, the user indicates that he or she wishes to become a member of the system, for example, by way of activating mechanisms of the client terminal apparatus 5. By way of example, the client terminal apparatus 5 may contain and execute a suitable computer program that facilitates the membership process.

At step 5172, the client terminal apparatus 5 establishes a communication link with the administrative server 4, preferably over the network 6. At step S174, a request by the client terminal apparatus 5 to become a member of the rental system is preferably made in which the client terminal apparatus 5 transmits the machine ID to the administrative server 4 over the network 6. In response, the administrative server 4 produces an electronic membership certificate, which is preferably substantially unique to the client terminal apparatus 5. The administrative server 4 may also associate the machine ID of the client terminal apparatus 5 with the electronic membership certificate, for example, using the database association techniques described hereinabove with respect to previous embodiments of the invention. At step S180, the administrative server 4 preferably transmits the electronic membership certificate to the client terminal apparatus 5 over the network 6. As will be described below, the electronic membership certificate is used in the rental process.

At step S72, the client terminal apparatus 5 establishes a communication link with the administrative server 4, preferably over the network 6. At step S74, a request by the client terminal apparatus 5 to become a member of the rental system is preferably made in which the client terminal apparatus 5 transmits the machine ID to the administrative server 4 over the network 6. In response, the administrative server 4 produces an electronic membership certificate, which is preferably substantially unique to the client terminal apparatus 5. The administrative server 4 may also associate the machine ID of the client terminal apparatus 5 with the electronic membership certificate, for example, using the database association techniques described hereinabove with respect to previous embodiments of the invention. At step S80, the administrative server 4 preferably transmits the electronic membership certificate to the client terminal apparatus 5 over the network 6. As will be described below, the electronic membership certificate is used in the rental process.

Figure 20:
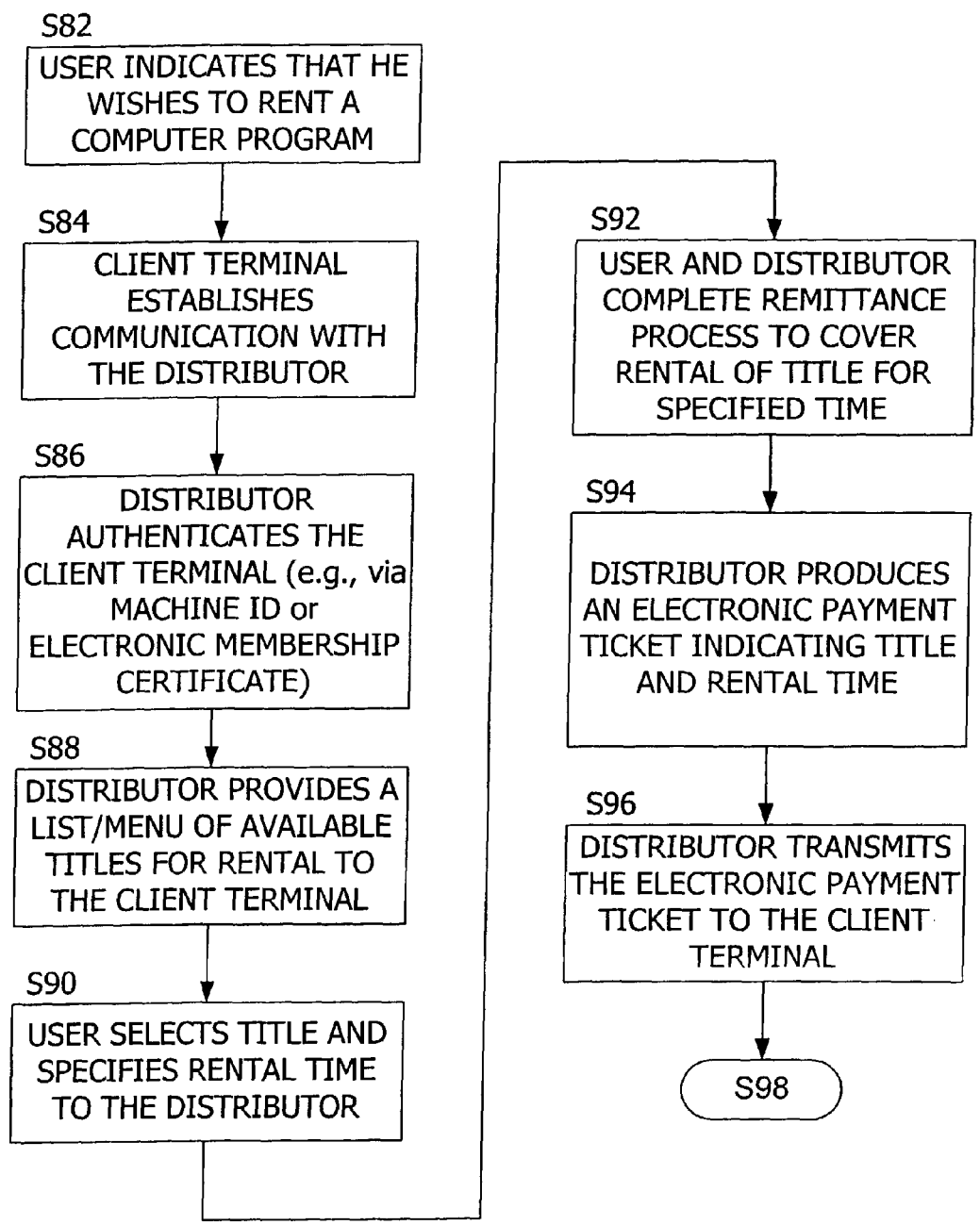
FIG. 20 is a flow diagram illustrating further process steps of the invention of FIG. 19.

Once the client terminal apparatus 5 has become a member of the rental system, the user is preferably permitted to rent program content, such as application programs, and system programs. In a preferred embodiment, the program content is preferably a video game computer program. With reference to FIG. 20, the computer software running on the client terminal apparatus 5 preferably permits the user to indicate that he or she wishes to rent a computer program. In response to an indication from the user in this regard (step 82), the client terminal apparatus 5 preferably establishes a communication link with the distributor (step S84) over which a rental request by the user is transmitted to the distributor. At step S86, the distributor preferably authenticates the client terminal apparatus 5, for example, by analyzing the machine ID of the client terminal apparatus 5 or by analyzing the electronic membership certificate thereof. This is accomplished by requiring that the client terminal apparatus 5 provide the machine ID and/or the electronic membership certificate to the distributor and that the distributor has access to a database where this information may be verified.

Assuming that the client terminal apparatus 5 has been authenticated, the distributor preferably provides a list or a menu of available titles for rental to the client terminal apparatus 5 over the network 6 (step S88). The computer software running on the client terminal apparatus 5 preferably facilitates the display of the list or menu of titles to the user so that the user may select a title and specify a rental time (step S90). The user's selection and specified rental time are preferably transmitted to the distributor over the network 6.

At step S92, the distributor preferably requires that the client terminal apparatus 5 provide remittance to cover the rental cost of the computer program for the specified time. This may be accomplished utilizing any of the known techniques, for example, by transmitting a credit card number, a demand deposit account number, by way of invoice, etc. Once remittance has been made, the distributor preferably produces an electronic payment ticket indicating that remittance has been made for the indicated title and rental time (step S94). At step S96, the distributor preferably transmits the electronic payment ticket to the client terminal apparatus 5 over the network 6.

In accordance with the present invention, the electronic payment ticket preferably provides the user (or client terminal apparatus 5) with a certain level of rental rights in exchange for the remittance provided to the distributor. For example, these rental rights may specify the title of the computer program, the rental time, the remittance value, etc. In addition, the electronic payment ticket may include additional information, such as a description key that is capable of decrypting the computer program. While it is not required that the electronic payment ticket include the decryption key, indeed the inclusion thereof is given by way of example only. It is also contemplated that the electronic payment ticket may include the decryption key in an encrypted form, for example, by encrypting it using the machine ID or utilizing other information that may be part of the electronic membership certificate (such as a virtual ID or the like). In any case, at this point in the process, the user has preferably received a certain level of rental rights, but has not yet received the computer program or an encrypted version of the computer program.

Figure 21:
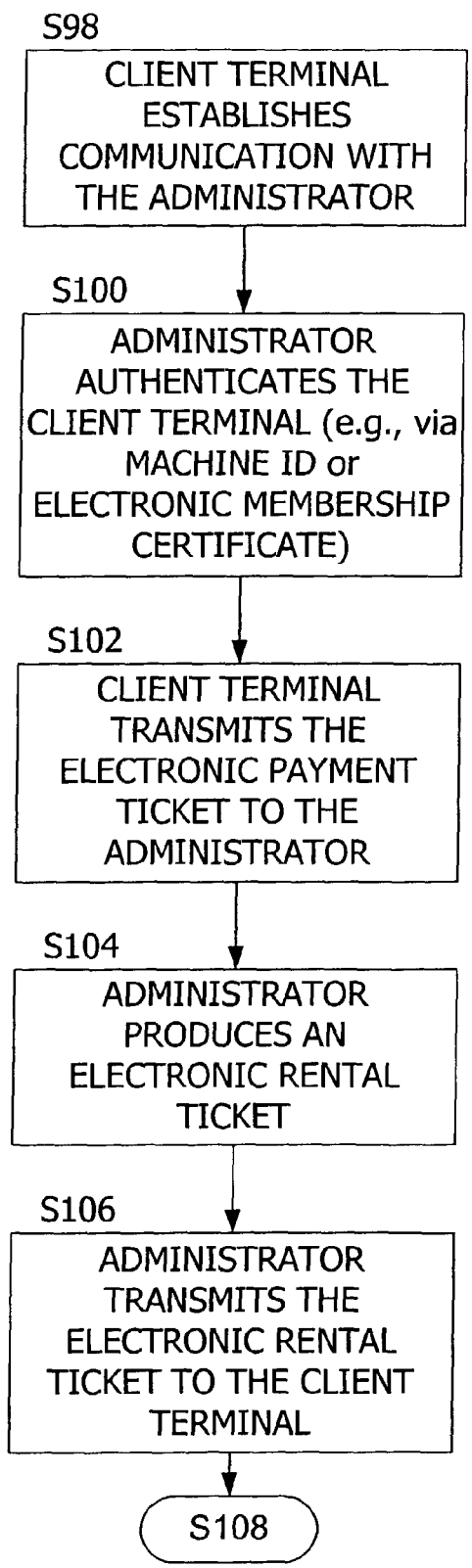
FIG. 21 is a flow diagram illustrating further process steps of the invention of FIG. 20.

At this stage in the process, the client terminal apparatus 5 has possession of its machine ID, the electronic membership certificate, and an electronic payment ticket indicating that remittance has been made for a title for a given period of time. With reference to FIG. 21, the client terminal apparatus 5 preferably establishes a communication link with the administrative server 4 over the network 6 (step S98). At step S100, the administrative server 4 preferably authenticates the client terminal apparatus 5 by way of the machine ID or electronic membership certificate. It is noted that this may be achieved by accessing an appropriate database, such as the personalizing database 6, which preferably contains the association of the machine ID of the client terminal apparatus 5 with the electronic membership certificate that was previously provided. At step S102, the client terminal apparatus 5 preferably transmits the electronic payment ticket to the administrative server 4 over the network 6. In response, the administrative server 4 preferably produces an electronic rental ticket (step 104) and transmits the electronic rental ticket to the client terminal apparatus 5 over the network 6 (step S106).

In accordance with the present invention, the electronic rental ticket preferably provides the user (or the client terminal apparatus 5) with a level of rental rights that may be the same as, or greater than, the rental rights provided by the electronic payment ticket. For example, the electronic rental ticket may specify the computer program title, the rental time, the remittance value, and may also include additional information, such as a decryption key that is capable of decrypting the encrypted computer program (assuming that the decryption key is not contained in the electronic payment ticket). While it is not required that the electronic rental ticket include the decryption key, indeed the inclusion thereof is given by way of example only. It is also contemplated that the electronic rental ticket may include the decryption key in an encrypted form, for example, by encrypting it using the machine ID or utilizing other information that may be part of the electronic membership certificate (such as a virtual ID or the like). In any case, at this point in the process, the user has preferably received a certain level of rental rights, but has not yet received the computer program or an encrypted version of the computer program.

Figure 22:
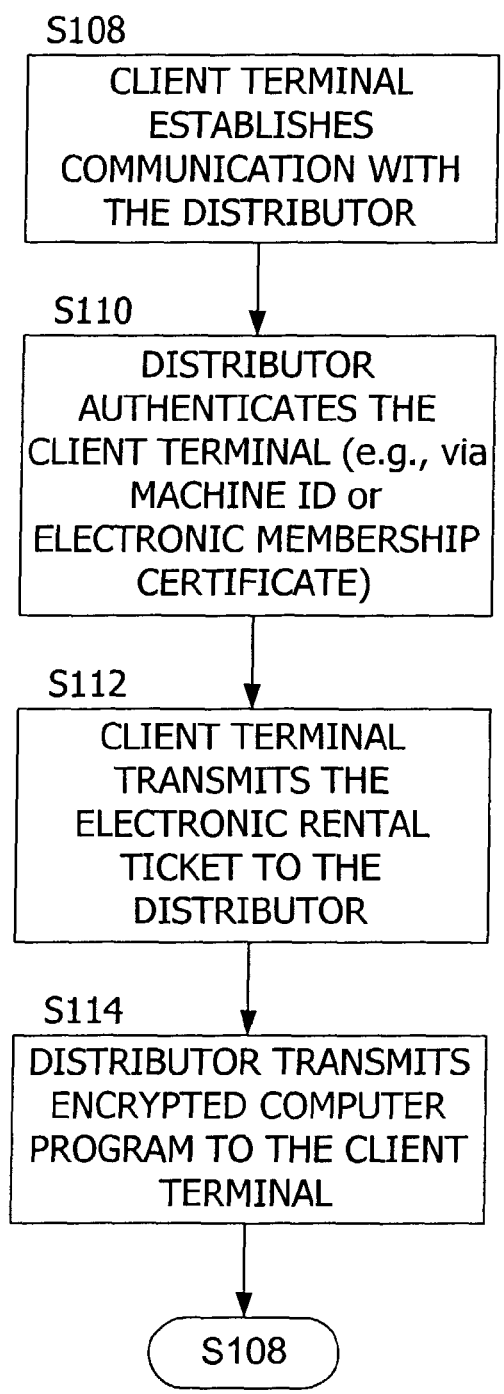
FIG. 22 is a flow diagram illustrating further process steps of the invention of FIG. 21.

With reference to FIG. 22, the client terminal apparatus 5 preferably establishes a communication link with the distributor over the network 6 (step S108). In response, the distributor may authenticate the client terminal apparatus 5, for example, by way of analysis of the machine ID or the electronic membership certificate as discussed hereinabove (step S110). Next, the client terminal apparatus 5 preferably transmits the electronic rental ticket (or at least a portion thereof) to the distributor over the network 6 (step S112). Preferably, this indicates to the distributor that the client terminal apparatus 5 has complete all previous necessary steps and is authorized to receive an encrypted version of the computer program for rental (step S114). At this point in the process, the client terminal apparatus 5 preferably has possession of the machine ID, the electronic membership certificate (including virtual ID if any), the electronic payment ticket, the electronic rental ticket, the encrypted decryption key, and the encrypted computer program.

In accordance with the present invention, it is contemplated that the user may load, install, and execute the computer program utilizing the processes described hereinabove with respect to previous embodiments of the invention. Advantageously, the rental system embodiment of the present invention enables the secure distribution of rental program content to any number of client terminal apparatus 5 over the network 6.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus operable to receive an encrypted program used in a rental system, the apparatus comprising:

a network interface operable to provide communication with a network such that (i) a first communication link is established between a user of the apparatus and an administrator over the network, (ii) a request by the user of the apparatus to become a member of the rental system is transmitted to the administrator using the first communication link, the request including a machine ID of the apparatus, (iii) an electronic membership certificate associated with the apparatus is received from the administrator using the first communication link, (iv) a second communication link is established between the user of the apparatus and a distributor over the network, (v) a rental request by the user of the apparatus and at least one of the machine ID or the electronic membership certificate are transmitted over the network to the distributor using the second communication link, (vi) a list or menu of titles available for rental is received over the network from the distributor, (vii) a user-selected one of the titles available for rental and a remittance to cover rental cost for the user-selected title are transmitted over the network to the distributor using the second communication link, (viii) an electronic payment ticket is received from the distributor using the second communication link, the electronic payment ticket indicating that the remittance to cover the rental cost for the user-selected title has been provided and conferring a particular level of rental rights based on the transmitted remittance, (ix) the electronic payment ticket and at least one of the machine ID or the electronic membership certificate are transmitted over the network to the administrator, (x) an electronic rental ticket is received over the network from the administrator that produced the electronic rental ticket in response to receiving the transmitted electronic payment ticket, the electronic rental ticket indicating that the user is now authorized to receive the encrypted program and conferring a same or greater level of rental rights than that conferred by the electronic payment ticket, (xi) the electronic rental ticket and at least one of the machine ID or the electronic membership certificate are transmitted over the network to the distributor, and (xii) the encrypted program, an encrypted decryption key and an encrypted virtual ID are received over the network from the distributor, the virtual ID being generated using at least the machine ID;

a decryption device operable to decrypt the encrypted decryption key, to decrypt the encrypted program using the decryption key, and to re-encrypt the decrypted program using the virtual ID; and a first storage device operable to store the encrypted virtual ID and the re-encrypted program.

2. The apparatus of claim 1, wherein the network interface is operable to provide communication with a network such that the machine ID and a distributor ID are transmitted over the network to the administrator, and registration data is received over the network from the administrator in response to the machine ID and the distributor ID, the registration data including the machine ID.

3. The apparatus of claim 2, wherein the registration data includes at least one of the machine ID and the distributor ID.

4. The apparatus of claim 1, wherein: the machine ID is substantially unique to the apparatus;

and the virtual ID is associated with the machine ID.

5. The apparatus of claim 1, wherein the decryption device is operable to decrypt the encrypted virtual ID using the machine ID, to decrypt the encrypted decryption key using the virtual ID, to decrypt the encrypted program using the decryption key, and to re-encrypt the program using the virtual ID.

6. The apparatus of claim 5, wherein the first storage device is further operable to store the machine ID.

7. The apparatus of claim 6, wherein the decryption device is operable to decrypt the encrypted virtual ID using the machine ID, and to decrypt the re-encrypted program using the virtual ID such that the apparatus is capable of executing the program.

8. The apparatus of claim 6, wherein the first storage device is removably connectable with the apparatus.

9. The apparatus of claim 6, further comprising:

a second storage device containing the machine ID; and a processor operable to compare the machine ID stored in the first storage device with the machine ID contained in the second storage device, and to proscribe use of the machine ID contained in either of the storage devices to decrypt the encrypted virtual ID when they do not match.

10. The apparatus of claim 9, wherein the processor is further operable to prompt a user of the apparatus to select a re-association routine when the machine ID stored in the first storage device does not match the machine ID contained in the second storage device.

11. The apparatus of claim 9, wherein the network interface is further operable to facilitate:
   the transmission of the machine ID contained in the second storage device, when it does do not match the machine ID stored in the first storage device, over the network to the distributor; and
   the reception of a new encrypted virtual ID over the network from the distributor, the new encrypted virtual ID being associated with the machine ID contained in the second storage device.

12. The apparatus of claim 11, wherein the first storage device is further operable to replace the encrypted virtual ID with the new encrypted virtual ID.

13. The apparatus of claim 12, wherein the decryption device is operable to decrypt the new encrypted virtual ID using the machine ID contained in the second storage device to obtain a new virtual ID, and to decrypt the re-encrypted program using the new virtual ID such that the apparatus is capable of executing the program.

14. The apparatus of claim 1, wherein the encrypted program is one of an application program and a system program.

15. A method carried out by an apparatus operable to receive an encrypted program used in a rental system, the method comprising:
   establishing a first communication link between a user of the apparatus and an administrator over a network;
   transmitting a request to become a member of the rental system by the user of the apparatus to the administrator using the first communication link, the request including a machine ID of the apparatus;
   receiving an electronic membership certificate associated with the apparatus from the administrator using the first communication link;
   establishing a second communication link between a user of the apparatus and a distributor over the network;
   transmitting a rental request by the user of the apparatus and at least one of the machine ID or the electronic certificate over the network to a distributor using the second communication link;
   receiving a list or menu of titles available for rental from the distributor over the network;
   transmitting a user-selected one of the titles available for rental and a remittance to cover rental cost for the user-selected title over the network to the distributor using the second communication link;
   receiving an electronic payment ticket from the distributor using the second communication link, the electronic payment ticket indicating that the remittance to cover the rental cost for the user-selected title has been provided and conferring a particular level of rental rights based on the transmitted remittance;
   transmitting the electronic payment ticket and at least one of the machine ID or the electronic membership certificate are over the network to the administrator;
   receiving an electronic rental ticket over the network from the administrator that produced the electronic rental ticket in response to receiving the transmitted electronic payment ticket, the electronic rental ticket indicating that the user is now authorized to receive the encrypted program and conferring a same or greater level of rental rights than that conferred by the electronic payment ticket;
   transmitting the electronic rental ticket and at least one of the machine ID or the electronic membership certificate over the network to the distributor;
   receiving the encrypted program, an encrypted decryption key and an encrypted virtual ID at the apparatus over the network from the distributor, the virtual ID being generated using at least the machine ID;
   decrypting the encrypted decryption key using the virtual ID, and decrypting the encrypted program using the decryption key;
   re-encrypting the program using the virtual ID; and
   storing the encrypted virtual ID and the re-encrypted program in a first storage device.

16. The method of claim 15, further comprising:
   transmitting the machine ID and a distributor ID over a network to the administrator; and
   receiving registration data over the network from the administrator in response to the machine ID and the distributor ID, the registration data including the machine ID.

17. The method of claim 16, wherein the registration data contains the machine ID and the distributor ID.

18. The method of claim 16, wherein the virtual ID is associated with the machine ID.

19. The method of claim 18, further comprising:
   decrypting the encrypted virtual ID using the machine ID;
   decrypting the encrypted decryption key using the virtual ID;
   decrypting the encrypted program using the decryption key; and
   re-encrypting the program using the virtual ID.

20. The method of claim 19, further comprising storing the machine ID and the encrypted virtual ID in the first storage device.

21. The method of claim 20, further comprising:
   decrypting the encrypted virtual ID using the machine ID, and
   decrypting the re-encrypted program using the virtual ID such that the apparatus is capable of executing the program.

22. The method of claim 20, wherein the first storage device is removably connectable with the apparatus.

23. The method of claim 20, wherein the apparatus includes a second storage device containing the machine ID, the method further comprising:
   comparing the machine ID stored in the first storage device with the machine ID contained in the second storage device, and
   proscribing use of the machine ID contained in either of the storage devices to decrypt the encrypted virtual ID when they do not match.

24. The method of claim 23, further comprising prompting a user of the apparatus to select a re-association routine when the machine ID stored in the first storage device does not match the machine ID contained in the second storage device.

25. The method of claim 23, further comprising:
   transmitting the machine ID contained in the second storage device, when it does not match the machine ID stored in the first storage device, over the network to the distributor; and
   receiving a new encrypted virtual ID over the network from the distributor, the new encrypted virtual ID being associated with the machine ID contained in the second storage device.

26. The method of claim 25, further comprising: replacing the encrypted virtual ID with the new encrypted virtual ID in the first storage device.

27. The method of claim 26, further comprising:
   decrypting the new encrypted virtual ID using the machine ID contained in the second storage device, and decrypting the re-encrypted program using the new encrypted virtual ID such that the apparatus is capable of executing the program.

28. The method of claim 15, wherein the encrypted program is one of an application program and a system program.

29. An apparatus operable to distribute an encrypted program used in a rental system, the apparatus comprising:
an input interface operable to receive the encrypted program and a non-activated decryption key from an administrator, the non-activated decryption key, when activated, being usable to decrypt the encrypted program;
a network interface operable to provide communication with a network such that (i) a request to activate the non-activated decryption key is transmitted to an administrator over the network, and (ii) activation grant information is received from the administrator over the network in response to the activation request;
a data processor operable to convert the non-activated decryption key into an activated decryption key using the activation grant information; and
a database operable to store a plurality of such activated decryption keys corresponding to a plurality of encrypted programs;
the network interface being further operable to (iii) establish a communication link with a user of a processing apparatus over the network, (iv) receive a rental request by the user of the apparatus and at least one of a machine ID or an electronic membership certificate over the network from the processing apparatus, the electronic membership certificate being associated with the processing apparatus, (v) verify the received at least one of a machine ID or an electronic certificate, and (vi) in response to successfully verifying the received at least one of a machine ID or an electronic certificate, to (a) transmit a list or menu of titles available for rental over the network to the processing apparatus, (b) receive a user-selected one of the titles available for rental and a remittance to cover rental cost for the user-selected title over the network from the processing apparatus, (c) transmit an electronic payment ticket over the network to the processing apparatus, the electronic payment ticket indicating that the remittance to cover the rental cost for the user-selected title has been provided and conferring a particular level of rental rights based on the received remittance, (d) receive an electronic rental ticket over the network from the processing apparatus, the electronic rental ticket being produced by the administrator in response to receiving the electronic payment ticket, indicating that the user is now authorized to receive the encrypted program, and conferring a same or greater level of rental rights than that conferred by the electronic payment ticket, and (e) transmit at least one of the plurality of encrypted programs over the network to the processing apparatus.

30. The apparatus of claim 29, wherein the input interface is further operable to
(i) receive decryption key management data containing a distributor ID from the administrator, the distributor ID being a substantially unique identifier;
(ii) transmit the decryption key management data and the activation request to the administrator; and
(iii) receive the activation grant information if the decryption key management data is valid.

31. The apparatus of claim 29, wherein the non-activated decryption key is an initially encrypted decryption key, and the data processor is operable to decrypt the initially encrypted decryption key using the activation grant information to produce the activated decryption key.

32. The apparatus of claim 29, wherein:
the network interface is further operable to provide communication with the network such that respective registration data, each being related to a respective processing apparatus, is received over the network from the processing apparatus;
the database operable to store respective machine ID's, each corresponding with a respective one of the processing apparatus;
the data processor is further operable to search the database for a machine ID matching any received registration data;
the network interface is further operable to facilitate the transmission of an encrypted activated decryption key to the processing apparatus over the network in response to the received registration data; and
the activated decryption key is used to decrypt an encrypted program located at the processing apparatus.

33. The apparatus of claim 32, wherein:
the registration data includes a machine ID that is substantially unique to the corresponding processing apparatus; and
the data processor is operable to produce the encrypted activated decryption key in response to the machine ID.

34. The apparatus of claim 33, wherein:
the data processor is further operable to produce a virtual ID as a function of the machine ID such that the virtual ID is associated with the machine ID, to encrypt the activated decryption key using the virtual ID, and to encrypt the virtual ID using the machine ID; and
the network interface is further operable to facilitate the transmission of the encrypted virtual ID over the network to the processing apparatus.

35. The apparatus of claim 34, wherein: the processing apparatus includes a second storage device containing the machine ID; the processing apparatus is operable to request an identification re-assignment when the machine ID stored in the first storage device does not match with the machine ID contained in the second storage device; the network interface is further operable to receive the machine ID (an old machine ID) stored in the first storage device and the machine ID (a new machine ID) contained in the second storage device of the processing apparatus over the network; the data processor is further operable to (i) search the database for a machine ID matching the old machine ID, (ii) obtain the virtual ID associated with the old machine ID, (iii) associate the virtual ID with the new machine ID, and (iv) encrypt the virtual ID using the new machine ID; and the network interface is further operable to facilitate the transmission of the new encrypted virtual ID over the network to the processing apparatus.

36. The apparatus of claim 32, wherein the network interface is further operable to facilitate the transmission of the encrypted program over the network to the processing apparatus.

37. The apparatus of claim 32, wherein the program is one of an application program and a system program.

38. The apparatus of claim 32, wherein: the database is further operable to store history data containing accounts relating to at least one of (i) the registration data received over the network from the processing apparatus, (ii) the respective machine IDs corresponding with the respective processing apparatus, and (iii) the activated decryption keys transmitted to the processing apparatus; and the network interface is further operable to facilitate the transmission of the history data to the administrator over the network.

39. The apparatus of claim 38, wherein the database is further operable to store the history data in a format that is accessible only by the administrator.

40. A method performed by an apparatus operable to distribute an encrypted program used in a rental system, the method comprising:
receiving an encrypted program and a non-activated decryption key from an administrator, the non-activated decryption key, when activated, being usable to decrypt the encrypted program;
transmitting a request to activate the non-activated decryption key to an administrator over a network, and receiving activation grant information from the administrator over the network in response to the activation request;
converting the non-activated decryption key into an activated decryption key using the activation grant information;
storing, in a database, a plurality of such activated decryption keys corresponding to a plurality of encrypted programs;
establishing a communication link with a user of a processing apparatus over the network;
receiving, over the network from the processing apparatus, a rental request by the user of the apparatus and an electronic membership certificate associated with the processing apparatus,;
verifying the received at least one of a machine ID or an electronic certificate; and
in response to successfully verifying the received at least one of a machine ID or an electronic certificate,
transmitting a list or menu of titles available for rental over the network to the processing apparatus,
receiving a user-selected one of the titles available for rental and a remittance to cover rental cost for the user-selected title over the network from the processing apparatus,
transmitting an electronic payment ticket over the network to the processing apparatus, the electronic payment ticket indicating that the remittance to cover the rental cost for the user-selected title has been provided and conferring a particular level of rental rights based on the received remittance,
receiving an electronic rental ticket over the network from the processing apparatus, the electronic rental ticket being produced by the administrator in response to receiving the electronic payment ticket, indicating that the user is now authorized to receive the encrypted program, and conferring a same or greater level of rental rights than that conferred by the electronic payment ticket, and
transmitting at least one of the plurality of encrypted programs over the network to the processing apparatus.

41. The method of claim 40, further comprising: receiving decryption key management data containing a distributor ID from the administrator over the network, the distributor ID being a substantially unique identifier; transmitting the decryption key management data and the activation request to the administrator over the network; and receiving the activation grant information over the network if the decryption key management data is valid.

42. The method of claim 40, wherein the non-activated decryption key is an initially encrypted decryption key, the method further comprising decrypting the initially encrypted decryption key using the activation grant information to produce the activated decryption key.

43. The method of claim 40, further comprising:
receiving respective registration data, each being related to a respective processing apparatus, over a network from the processing apparatus;
storing in a database respective machine IDs, each corresponding with a respective one of the processing apparatus;
searching the database for machine IDs matching any received registration data;
transmitting an encrypted activated decryption key over the network to the processing apparatus in response to the received registration data, where the decryption key is used to decrypt an encrypted program located at the processing apparatus.

44. The method of claim 43, wherein: the registration data includes a machine ID that is substantially unique to the corresponding processing apparatus; and the encrypted activated decryption key is produced and transmitted in response to the machine ID.

45. The method of claim 44, further comprising:
producing a virtual ID as a function of the machine ID such that the virtual ID is associated with the machine ID;
encrypting the activated decryption key using the virtual ID;
encrypting the virtual ID using the machine ID; and
transmitting the encrypted activated decryption key and the encrypted virtual ID over the network to the processing apparatus.

46. The method of claim 45, wherein the processing apparatus includes a second storage device containing the machine ID (a new machine ID), and the processing apparatus is operable to request an identification re-assignment when the machine ID (an old machine ID) stored in a first storage device does not match with the new machine ID, the method further comprising:
receiving the old machine ID and the new machine ID;
searching the database for the old machine ID;
obtaining the virtual ID associated with the old machine ID;
associating the virtual ID with the new machine ID;
encrypting the virtual ID using the new machine ID; and
transmitting the new encrypted virtual ID to the processing apparatus.

47. The method of claim 43, further comprising transmitting the encrypted program over the network to the processing apparatus.

48. The method of claim 43, wherein the program is one of an application program and a system program.

49. The method of claim 40, further comprising:
storing history data in the database containing accounts relating to at least one of (i) the registration data received over the network from the processing apparatus, (ii) the respective machine IDs corresponding with the respective processing apparatus, and (iii) the activated decryption keys transmitted to the processing apparatus; and
transmitting the history data to the administrator over the network.

50. The method of claim 49, wherein the history data is stored in a format that is accessible only by the administrator.

51. An apparatus operable to administer distribution of an encrypted program used in a rental system, the apparatus comprising:
a network interface operable to provide communication with a network such that (i) respective communication links are established over a network with each of one or more processing apparatuses, (ii) respective requests by users of the one or more processing apparatuses to become members of the rental system are received over the network using the respective communication links, each of the requests including a specific machine ID associated with its respective processing apparatus, (iii) respectively associated electronic membership certificates are transmitted to each of the processing apparatuses using the respective communication links in response to receiving the machine IDs, (iv) an electronic payment ticket and at least one of the machine ID or the electronic membership certificate respectively associated with a given one of the processing apparatuses are further received over the network from that processing apparatus, the electronic payment ticket indicating that a remittance to cover rental cost for a user-selected title has been transmitted by that processing apparatus to a distributor and conferring a particular level of rental rights based on the transmitted remittance (v) in response to receiving the electronic payment ticket and at least one of the machine ID or the electronic membership certificate, an electronic rental ticket indicating that the user of that processing apparatus is now authorized to receive the encrypted program and conferring a same or greater level of rental rights than that conferred by the electronic payment ticket is produced, and (v) the electronic rental ticket is transmitted over the network to that processing apparatus; and a database operable to store the received machine IDs and the respectively associated electronic membership certificates;

wherein the electronic rental ticket and at least one of the machine ID or the electronic certificate is used by the associated processing apparatus to obtain an encrypted program, an associated encrypted decryption key and an associated encrypted virtual ID from the distributor over the network, the virtual ID being generated using at least the machine ID of that processing apparatus, the encrypted decryption key is decrypted by the processing apparatus using the virtual ID, and the encrypted program is decrypted by the processing apparatus using the decryption key.

52. The apparatus of claim 51, wherein the network interface is further operable to transmit an encrypted program and a non-activated decryption key to a distributor over the network, the non-activated decryption key, when activated, being usable to decrypt the encrypted program.

53. The apparatus of claim 52, wherein the network interface is further operable to (i) receive an activation request from the distributor over the network, and (ii) transmit activation grant information to the distributor over the network in response to the activation request, wherein the non-activated decryption key is converted into an activated decryption key in response to the activation grant information.

54. The apparatus of claim 51, wherein the network interface is further operable to (i) transmit decryption key management data containing a distributor ID to the distributor, the distributor ID being a substantially unique identifier; (ii) receive the decryption key management data and the activation request from the distributor; and (iii) transmit the activation grant information if the decryption key management data is valid.

55. A method performed by an apparatus operable to administer distribution of an encrypted program used in a rental system, the method comprising:

establishing respective communication links over a network with each of one or more processing apparatuses;
receiving respective requests to become members of the rental system by users of the one or more processing apparatuses over the network using the respective communication links, each of the requests including a specific machine ID associated with its respective processing apparatus;

transmitting respectively associated electronic membership certificates to each of the processing apparatuses using the respective communication links in response to receiving the machine IDs;

receiving, from a given one of the processing apparatuses over the network, an electronic payment ticket and at least one of the machine ID or the electronic membership certificate respectively associated with that processing apparatus, the electronic payment ticket indicating that a remittance to cover rental cost for a user-selected title has been transmitted by that processing apparatus to a distributor and conferring a particular level of rental rights to based on the transmitted remittance;

producing, in response to receiving the electronic payment ticket and the at least one of the machine ID or the electronic membership certificate, an electronic rental ticket indicating that the user of that processing apparatus is now authorized to receive the encrypted program and conferring a same or greater level of rental rights than that conferred by the electronic payment ticket;

transmitting the electronic rental ticket over the network to that processing apparatus; and storing the received machine IDs and the respectively associated electronic certificates in a database;

wherein the electronic rental ticket and at least one of the machine ID or the electronic certificate is used by the associated processing apparatus to obtain the encrypted program, an associated encrypted decryption key and an associated encrypted virtual ID from the distributor over the network, the virtual ID being generated using at least the machine ID of that processing apparatus, the encrypted decryption key is decrypted by the processing apparatus using the virtual ID, and the encrypted program is decrypted by the processing apparatus using the decryption key.

56. The method of claim 55, further comprising transmitting an encrypted program and a non-activated decryption key to a distributor over the network, the non-activated decryption key, when activated, being usable to decrypt the encrypted program.

57. The method of claim 56, further comprising (i) receiving an activation request from the distributor over the network, and (ii) transmitting activation grant information to the distributor over the network in response to the activation request, wherein the non-activated decryption key is converted into an activated decryption key in response to the activation grant information.

58. The method of claim 55, further comprising (i) transmitting decryption key management data containing a distributor ID to the distributor, the distributor ID being a substantially unique identifier; (ii) receiving the decryption key management data and the activation request from the distributor; and (iii) transmitting the activation grant information if the decryption key management data is valid.

59. The apparatus of claim 1, wherein the machine ID is used to decrypt the encrypted virtual ID.

60. The method of claim 15, further comprising decrypting the encrypted virtual ID using the machine ID.

61. The apparatus of claim 29, wherein a virtual ID based on the machine ID, is decrypted by the machine ID.

62. The method of claim 40, further comprising decrypting an encrypted virtual ID, using the machine ID, based on the machine ID.

63. The apparatus of claim 51, wherein the machine ID is used to decrypt the virtual ID.

64. The method of claim 55, further comprising decrypting the encrypted virtual ID using the machine ID.

65. The apparatus of claim 1, wherein a rental time for the user-selected title is transmitted with the user-selected one of the titles available for rental and the remittance.

66. The apparatus of claim 1, wherein the remittance is at least one of a credit card number, a demand deposit account number, or an invoice.

67. The method of claim 15, wherein a rental time for the user-selected title is transmitted with the user-selected one of the titles available for rental and the remittance.

68. The method of claim 15, wherein the remittance is at least one of a credit card number, a demand deposit account number, or an invoice.

69. The apparatus of claim 29, wherein a rental time for the user-selected title is received with the user-selected one of the titles available for rental and the remittance.

70. The apparatus of claim 29, wherein the remittance is at least one of a credit card number, a demand deposit account number, or an invoice.

71. The apparatus of claim 29, wherein the electronic membership certificate is obtained by the processing apparatus over the network from the administrator in response to a request that includes a machine ID associated with the processing apparatus.

72. The method of claim 40, wherein a rental time for the user-selected title is received with the user-selected one of the titles available for rental and the remittance.

73. The method of claim 40, wherein the remittance is at least one of a credit card number, a demand deposit account number, or an invoice.

74. The method of claim 40, wherein the electronic membership certificate is obtained by the processing apparatus over the network from the administrator in response to a request that includes a machine ID associated with the processing apparatus.

75. The apparatus of claim 51, wherein the remittance is at least one of a credit card number, a demand deposit account number, or an invoice.

76. The apparatus of claim 51, wherein the electronic payment ticket is obtained by the processing apparatus from the distributor in response to the processing apparatus transmitting the user-selected title, a rental time for the user-selected title, and the remittance over the network to the distributor.

77. The method of claim 55, wherein the remittance is at least one of a credit card number, a demand deposit account number, or an invoice.

78. The method of claim 55, wherein the electronic payment ticket is obtained by the processing apparatus from the distributor in response to the processing apparatus transmitting a user-selected title, a rental time for the user-selected title, and the remittance over the network to the distributor.

\* \* \* \* \*